(12) United States Patent
Subramaniam et al.

(10) Patent No.: US 10,045,065 B2
(45) Date of Patent: Aug. 7, 2018

(54) SYNCHRONIZATION AND CONTROL OF OVERLAY CONTENTS FOR VIDEO STREAMING IN A WIRELESS COMMUNICATION SYSTEM

(71) Applicant: QUALCOMM Incorporated, San Diego, CA (US)

(72) Inventors: Vijay Naicker Subramaniam, San Diego, CA (US); Padam Lal Kafle, San Diego, CA (US); Fawad Shaukat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/845,211

(22) Filed: Sep. 3, 2015

(65) Prior Publication Data
US 2016/0073155 A1    Mar. 10, 2016

Related U.S. Application Data

(60) Provisional application No. 62/046,751, filed on Sep. 5, 2014.

(51) Int. Cl.
| | |
|---|---|
| *H04N 21/43* | (2011.01) |
| *H04N 21/431* | (2011.01) |
| *H04N 21/432* | (2011.01) |
| *H04N 21/4335* | (2011.01) |
| *H04N 21/435* | (2011.01) |
| *H04N 21/4363* | (2011.01) |
| *H04N 21/81* | (2011.01) |
| *H04N 21/854* | (2011.01) |
| *H04N 21/434* | (2011.01) |
| *H04N 21/426* | (2011.01) |

(52) U.S. Cl.
CPC ....... *H04N 21/4316* (2013.01); *H04N 21/435* (2013.01); *H04N 21/4335* (2013.01); *H04N 21/4343* (2013.01); *H04N 21/43637* (2013.01); *H04N 21/8146* (2013.01); *H04N 21/8153* (2013.01); *H04N 21/85406* (2013.01); *H04N 21/42653* (2013.01)

(58) Field of Classification Search
CPC ........... H04N 21/4302; H04N 21/4307; H04N 21/4316; H04N 21/4325
USPC .................................................. 725/135–140
See application file for complete search history.

(56) References Cited

U.S. PATENT DOCUMENTS

| | | | |
|---|---|---|---|
| 6,698,020 B1 * | 2/2004 | Zigmond | ........... H04N 5/44513 348/E5.102 |
| 8,752,113 B1 | 6/2014 | Good et al. | |
| 2004/0119728 A1 | 6/2004 | Blanco et al. | |

(Continued)

FOREIGN PATENT DOCUMENTS

EP    2728855 A1    5/2014

OTHER PUBLICATIONS

International Search Report and Written Opinion—PCT/US2015/048701—ISA/EPO—Nov. 13, 2015.

*Primary Examiner* — Dominic D Saltarelli
(74) *Attorney, Agent, or Firm* — Knobbe, Martens, Olson & Bear, LLP

(57) ABSTRACT

Wireless communication devices are provided with direct video and audio streaming capability. The streaming capability may support overlays. Some implementations include incorporation of these features into devices with a mirroring display mode.

25 Claims, 10 Drawing Sheets

(56) References Cited

U.S. PATENT DOCUMENTS

| | | |
|---|---|---|
| 2006/0083301 A1 | 4/2006 | Nishio |
| 2008/0068500 A1 | 3/2008 | Krause |
| 2011/0154390 A1* | 6/2011 | Smith ................... H04N 21/482 725/32 |
| 2015/0179130 A1* | 6/2015 | Smadi ..................... G09G 5/006 345/520 |
| 2015/0326951 A1* | 11/2015 | Strein .............. H04N 21/23418 725/32 |

* cited by examiner

SYNCHRONIZATION AND CONTROL OF OVERLAY CONTENTS FOR VIDEO STREAMING IN A WIRELESS COMMUNICATION SYSTEM

PRIORITY CLAIM

This application claims priority to and the benefit under 35 U.S.C. § 119(e) to U.S. Provisional Patent Application No. 62/046,751 entitled "SYNCHRONIZATION AND CONTROL OF OVERLAY CONTENTS FOR VIDEO STREAMING IN A WIRELESS COMMUNICATION SYSTEM" filed on Sep. 5, 2014, the disclosure of which is hereby incorporated by reference in its entirety as if fully set forth below and for all purposes.

BACKGROUND

Recent advances have been made to allow direct streaming of video and audio directly from one wireless communication enabled device to another. One such system is known as "Miracast." Miracast is a trademark for a wireless (e.g., IEEE 802.11 family of wireless protocols or "Wi-Fi") display protocol promulgated by the Wi-Fi Alliance. As used herein, the term Miracast refers to the current form of the Wi-Fi Alliance's display sharing protocol, also known as Wi-Fi Display (WFD). The Miracast specification is designed for streaming any type of video bitstream from a source device (or "source") to a sink device (or "sink"). As one example, a source may be a smart phone, and a sink may be a television set. Although client devices generally communicate through an access point (AP) device in IEEE 802.11 wireless networks, certain protocols (such as Wi-Fi Direct) may support direct device communications. The Miracast system uses such protocols for sending display data from one device to another, such as from a smart phone to a television or computer, or vice-versa. The Miracast system involves sharing the contents of a frame buffer and speaker audio of the source to a remote display/speaker device (sink) over a Wi-Fi connection.

The Miracast protocol involves the source capturing the RGB data from the frame buffer and any PCM (Pulse Coded Modulation) audio data from the audio subsystem. The content of the frame buffer may be derived from application programs or a media player running on the source. The source may then compress the video and audio content and transmit the data to the sink. On receiving the bitstream, the sink may decode and render the content on its local display and speakers.

When a user plays an audio/video clip locally on a source (e.g., a Miracast capable source), the bitstream may be decoded and rendered locally on the display of the source, and then the audio/video content may be captured, re-encoded, and streamed to a sink (e.g., a Miracast capable sink) at the same time. The sink may then decode and render the same content on its display and speakers. Such operation is often called the "mirroring" mode.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides, in a display data sink device configured to wirelessly receive display data including one or more overlays from a source device, the one or more overlays comprising graphical content to be displayed with one or more image frames displayed at the display data sink device, a method of handling the one or more overlays. The method comprises wirelessly receiving the one or more overlays. The method further comprises wirelessly receiving a first set of metadata associated with the one or more overlays, the first set of metadata defining information about displaying the one or more overlays, and wherein the first set of metadata includes an identifier for each of the one or more overlays. The method further comprises selectively storing, based on a value of the first set of metadata, the one or more overlays in association with their respective identifier.

In some embodiments, the method further comprises receiving, subsequent to the selectively storing, a second set of metadata containing a first identifier for a first overlay, the first overlay being one of the one or more overlays. In some embodiments, the method further comprises retrieving the first overlay in response to the receiving. In some embodiments, the method further comprises displaying the first overlay. In some embodiments, the second set of metadata is sent without the first overlay. In some embodiments, the method further comprises the second set of metadata comprises a presentation time stamp and a display location, and the displaying is performed in accordance with the presentation time stamp and the display location. In some embodiments, the second set of metadata further includes presentation mode information, and retrieving the first overlay is further based on a value of the presentation mode information. In some embodiments, the first set of metadata further includes presentation mode information, and selectively storing the one or more overlays is further based on a value of the presentation mode information. In some embodiments, the sink device stores the one or more overlays if the value of the presentation mode information indicates an instruction for the sink device to follow a passive presentation mode, and the sink device does not store the one or more overlays if the value of the presentation mode information does not indicate the instruction for the sink device to follow the passive presentation mode. In some embodiments, the first set of metadata includes one or more of: parameters for determining that the sink device can support overlays and alpha blending information defining an alpha blending mode to be used with one of the one or more overlays. In some embodiments, the first set of metadata includes an indication that per-pixel alpha data for blending is included in a packetized elementary stream (PES) packet with an offset parameter indicating a location at a data field at which the per-pixel alpha data is included. In some embodiments, the second set of metadata includes alpha blending information defining an alpha blending mode to be used with one of the one or more overlays. In some embodiments, the method further comprises sending information to the source device indicating that a user action has occurred prior to the receiving, retrieving, and displaying. In some embodiments, the one or more overlays are received as a Moving Picture Experts Group 2 (MPEG2) transport stream, wherein the first set of metadata is provided in a PES header in the MPEG2 transport stream, the PES header comprises a PES header format including fields that include information defining properties for at least the one or more overlays, and one or more portions of the transport stream are separately decoded on one or more other transport streams.

Another aspect of the present disclosure provides, in a display data source device configured to wirelessly transmit display data including one or more overlays to a sink device, the one or more overlays comprising graphical content to be displayed with one or more image frames displayed at the sink device, a method of handling the one or more overlays. The method comprises wirelessly transmitting the one or more overlays. The method comprises wirelessly transmitting a first set of metadata associated with the one or more overlays, the first set of metadata defining information about displaying the one or more overlays, and wherein the first set of metadata includes an identifier for each of the one or more overlays.

In some embodiments, the first set of metadata further includes presentation mode information instructing the sink device to selectively store, based on a value of the first set of metadata, the one or more overlays in association with their respective identifier. In some embodiments, the method further comprises receiving information from the sink device indicating that a user action has occurred on the sink device; and in response to the receiving, transmitting to the sink device a second set of metadata including instruction information instructing the sink device to retrieve and display one of the one or more overlays.

Another aspect of the present disclosure provides a display data sink device configured to wirelessly receive display data including one or more overlays from a source device, wherein the one or more overlays comprise graphical content to be displayed with one or more image frames displayed at the display data sink device, and to handle the one or more overlays. The display data sink device comprises a display. The display data sink device further comprises a memory. The display data sink device further comprises a wireless receiver. The display data sink device further comprises processing circuitry. The processing circuitry is configured to receive the one or more overlays. The processing circuitry is further configured to receive a first set of metadata associated with the one or more overlays, the first set of metadata defining information about displaying the one or more overlays on the display, and the first set of metadata includes an identifier for each of the one or more overlays. The processing circuitry is further configured to selectively store, based on a value of the first set of metadata, the one or more overlays in the memory in association with their respective identifier.

Another aspect of the present disclosure provides a display data source device configured to wirelessly transmit display data including one or more overlays to a sink device, wherein the one or more overlays comprise graphical content to be displayed with one or more image frames displayed at the sink device, and to handle the one or more overlays. The display data source device further comprises a wireless transmitter. The display data source device further comprises processing circuitry. The processing circuitry is configured to transmit the one or more overlays. The processing circuitry is further configured to transmit a first set of metadata associated with the one or more overlays, the first set of metadata defining information about displaying the one or more overlays on the display, and the first set of metadata includes an identifier for each of the one or more overlays.

Another aspect of the present disclosure provides a system for wirelessly transmitting display data from a source device to a sink device without passing the display data through an intermediary device. The system comprises a source device having a display and wireless transmission and receiving circuitry. The system further comprises a sink device having a display and wireless transmission and receiving circuitry. The source device and the sink device are configured to negotiate display transmission and receiving parameters to allow sending image data for multiple overlays from the source device to the sink device. The image data for at least one of the multiple overlays is stored at the sink device for later use by the sink device in response to a message sent from the source device to the sink device. The message instructs the sink device to retrieve the previously stored overlay and display the overlay at the sink device

DETAILED DESCRIPTION

Figure 1:
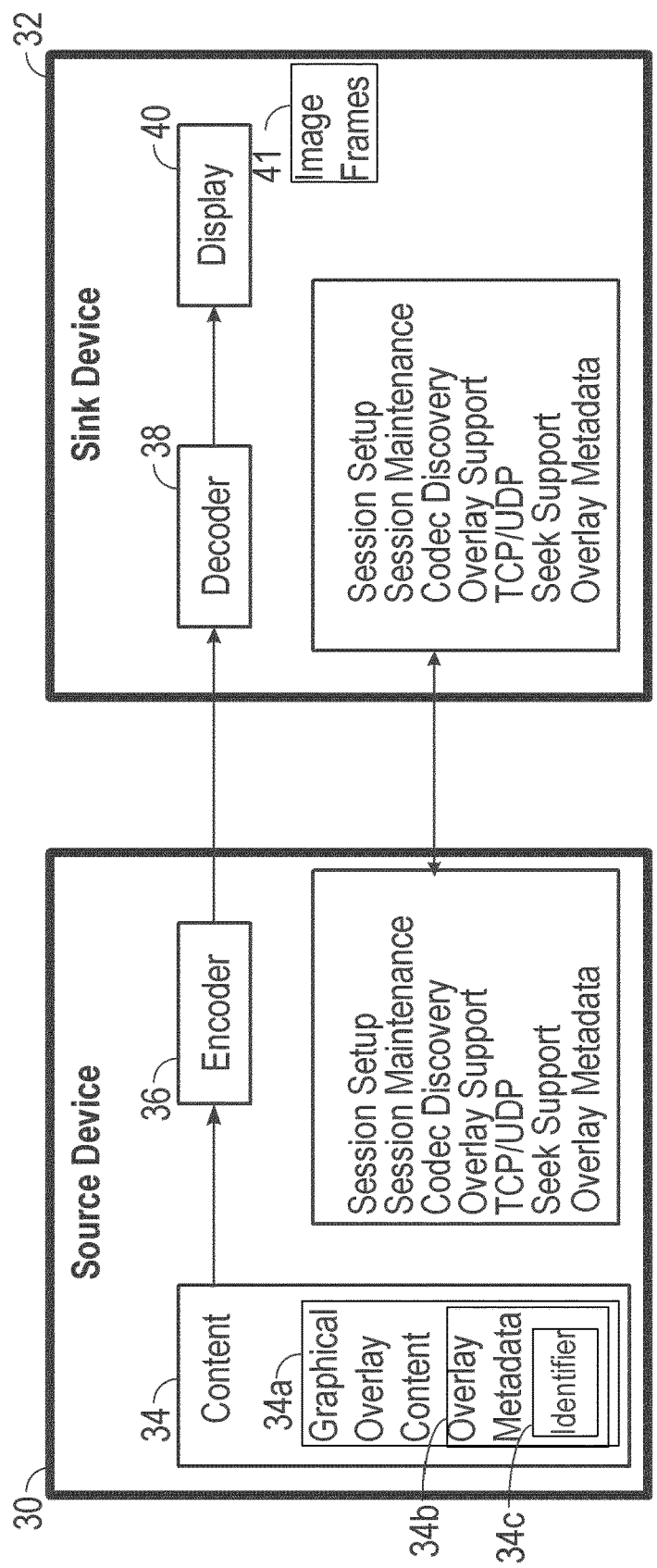
FIG. 1 is a block diagram of a source and a sink in one implementation of a video streaming system supporting direct streaming.

Various aspects of the novel systems, apparatuses, and methods are described more fully hereinafter with reference to the accompanying drawings. The teachings disclosed may, however, be embodied in many different forms and should not be construed as limited to any specific structure or function presented throughout this disclosure. Rather, these aspects are provided so that this disclosure is thorough and complete, and fully conveys the scope of the disclosure to those skilled in the art. The scope of the disclosure is intended to cover any aspect of the novel systems, apparatuses, and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The present disclosure is directed to systems and methods that allow a first device, referred to herein as a source, to deliver content to a second device, referred to herein as a sink, for display on the second device. In some implementations, each device is capable of communicating wirelessly according to one or more of the IEEE 802.11 family of wireless communication protocols. Although such devices generally communicate through an access point (AP), rather than directly, certain protocols allow sources to transmit video to sinks directly, without using any AP or other intermediary. As described above, one such protocol is known as Miracast or Wi-Fi Display. In some embodiments, the implementations described below use existing protocols as a starting point, for example, protocols including a mirroring mode (e.g., Miracast). In some embodiments, enhancements and extensions of such protocols are set forth below. Any such enhancements and extensions do not have application to just one protocol, but to any display sharing device or protocol, system, or method allowing transmission, reception, and presentation of display data on and between devices connected wirelessly in a local environment, where "local" refers generally to the range of a wireless local-area network (LAN) connection, such as within a room, building, and the like.

If a video clip is played on a source (e.g., in a Miracast type system), a basic mode (e.g., a mirroring mode) may require capturing the video output after it is decoded and then re-encoding it with an H.264 codec before streaming it to the sink. Such operation, often referred to as transcoding, causes the device to consume more power, because the video clip is first decoded using a video decoder and is then re-encoded before being streamed to the sink.

Transcoding video content may also potentially degrade video quality when an encoded bitrate is lower than a native bitrate of the video clip. This may occur, for example, because current implementations (e.g., in Miracast) require re-encoding using only the constrained base or constrained high profiles of H.264 codec, whereas video content is often available in other formats.

To overcome these limitations, wireless communication enabled devices can be supplemented to additionally support direct streaming capability, which allows streaming of audio/video content (e.g., display data) without the need of transcoding. This allows power reduction through streaming of bit-streams, and higher quality by obviating the transcoding.

Figure 2:
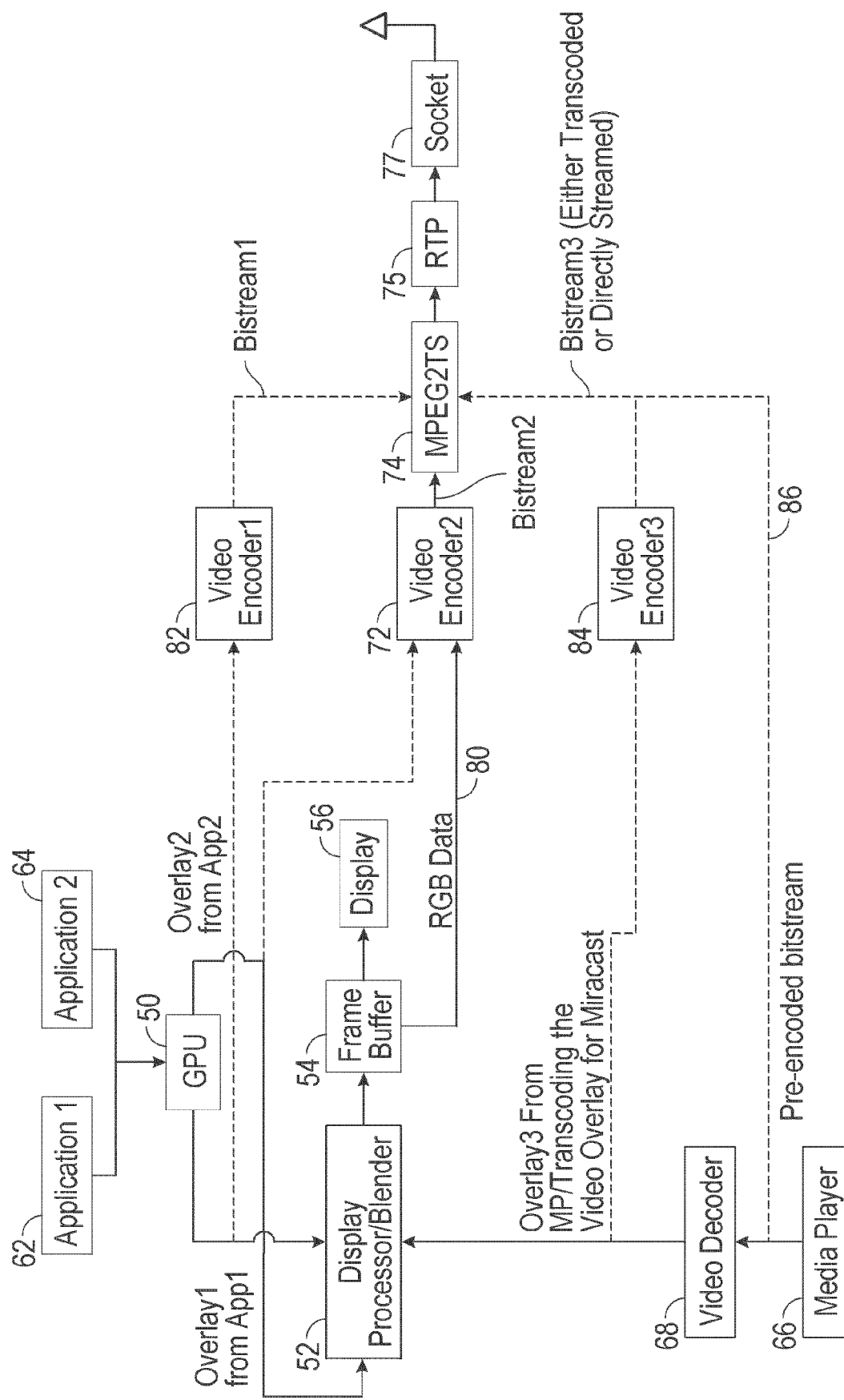
FIG. 2 is a block diagram of a source in one implementation of the video streaming system of FIG. 1.
Figure 3:
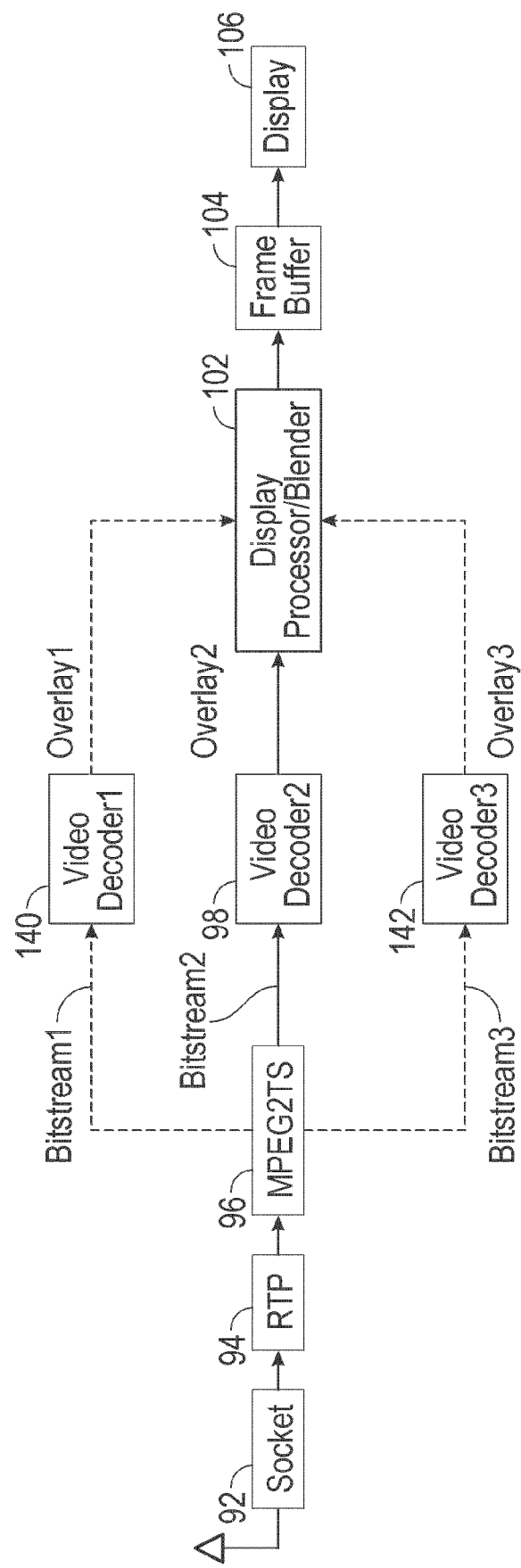
FIG. 3 is a block diagram of a sink in one implementation of the video streaming system of FIG. 1.

Referring now to FIGS. 1 through 3, in a display (e.g., an extended Miracast) system, additional control communications and transfer protocol negotiations can occur between a source device 30 (or "source 30") and a sink device 32 (or "sink 32"). As shown in FIG. 1, at the source 30, display data 34 (e.g., content) is routed to an encoder 36. The display data 34 may comprise one or more of video content, picture content, and/or graphical overlay content 34a that is to be displayed, stored, decoded, and/or processed at the sink 32. The graphical overlay content 34a may also be referred to as "overlay content" or simply as (one or more) "overlays." For example, the graphical overlay content 34a may include one or more overlays including graphical content to be displayed at the sink 32, for example, in addition to (or "over") other video or picture content. In some embodiments, the encoder 36 and decoder 38 may comprise H.264 protocols. The display data 34 is then transmitted wirelessly to the sink 32, using, for example, an MPEG2 transport stream with Real-time Transport Streaming Protocol (RTSP) messaging. When received at the sink 32, the data may be routed to a corresponding decoder 38 and sent to a display 40 on the sink 32. Control signals may also be passed between the source 30 and sink 32. In some embodiments, control signals for session setup and session maintenance are utilized. In the system of FIGS. 1 through 3, one or more additional control communications may occur between the source 30 and sink 32. For example, during capability negotiation, the source 30 may query the sink 32 for direct streaming to see if the sink 32 supports the feature itself. It may also query for various codecs and profiles for audio and video that the sink 32 supports and/or the TCP (Transmission Control Protocol) or UDP (User Datagram Protocol) port number(s) that the sink 32 wants the source 30 to direct stream content to. In one example, the sink 32 may respond to the source 30 with a list of audio/video codecs and profiles and the TCP or UDP port number if it supports direct streaming (e.g., during a Miracast session). After streaming of one video clip, another video clip may be switched into the direct streaming data path. This may allow the use of a variety of encoders 36 and decoders 38, with advantages described further below. As mentioned above and as described further below, the source 30 may provide the sink 32 with overlay content and/or support for handling said overlays. Support for handling said overlays may be included, for example, in metadata associated with the overlays. The metadata may comprise further information defining information about a video presentation to be displayed at the sink 32. For example, the metadata may define information about displaying the overlays. Such metadata may also be referred to as "overlay properties" or "overlay data." In one embodiment, the metadata may be included among the display data 34 (e.g., content or the graphical overlay content 34a). For example, as shown in FIG. 1, a first set of metadata (e.g., overlay metadata 34b) including an identifier (e.g., identifier 34c) for each of the one or more overlays may be included among the metadata included among the graphical overlay content 34a of the content 34. As one example, the sink 32 may be configured to display a series of image frames 41 that make up the video presentation. Based in part on the received display data 34 and the above mentioned received metadata, the sink 32 may be configured to display one or more overlays with one or more of the image frames 41 of the video presentation (e.g., image frames that make up the background video stream 152, as further described below). In one embodiment, based further on the metadata, the sink 32 may also be configured to selectively store the one or more overlays. Such selective storing is further described below. In one embodiment, the sink 32 may also be configured to retrieve and display one or more of the stored overlays based on subsequently received metadata (e.g., a second set of metadata), as further described below.

Referring now to FIG. 2, a block diagram of one implementation of a source 30 of FIG. 1 is illustrated. In FIG. 2, the source 30 includes a Graphics Processing Unit (GPU) 50, a Display Processor/Blender 52 (e.g., which may also be referred to as a display hardware abstraction layer or a "Display HAL"), a frame buffer 54, and a display 56. The source 30 may be running several applications such as Application 1 62 and Application 2 64 which may provide display data for presentation to a user. Under the control of the source 30 operating system, the GPU 50 and the Display Processor/Blender 52 prepare the display data and fill the frame buffer 54, for forwarding to the display 56. One function of the GPU 50 may be to generate a User Interface (UI). The source 30 may also include a media player 66 which also routes content to the Display Processor/Blender 52 through a video decoder.

Data flow in a stand-alone display mode and/or a mirroring mode is illustrated by the solid arrows of FIG. 2. When mirroring is being performed, the successive frames of pixel data in the frame buffer 54 are routed to a video encoder 72 along data path 80, the encoded data is assembled into an MPEG2 transport stream by module 74, combined with Real-time Transport Protocol (RTP) messaging data by module 75, and routed to a socket 77 for transmission to the sink 32. In some protocols (e.g., Miracast), the video encoder 72 is an H.264 encoder and the socket 77 is a UDP socket, with no other options supported.

A block diagram of one implementation of a sink 32 of FIG. 1 is illustrated in FIG. 3. In the sink 32, a socket 92 receives the incoming data stream, RTP messaging is extracted with module 94, and display data is extracted with module 96. As with FIG. 2, data flow is illustrated with solid arrows. The display data may be routed to a video decoder 98, then to a Display Processor/Blender 102, which fills a frame buffer 104 for presentation on the sink display 106. In some protocols (e.g., Miracast), the video decoder 98 may be an H.264 video decoder, which is generally required in a sink 32 compatible with such protocols.

It can be seen that in some protocols (e.g., Miracast), because pixel data is retrieved from the frame buffer 54 for transmission to the sink 32, no information is available regarding what types of display information may be loaded into the frame buffer 54. For example, the display information may be text from an application program 62 and 64, or a movie from the media player 66, or a combination of the two. In many cases, this information may be useful in optimizing the sink 32 display quality and minimizing power drain of the source 30.

To enhance the performance and capabilities of such display systems, additional video encoders 82 and 84 may be supported by the system, and additional data paths illustrated in broken arrows may be provided.

In one implementation, a direct streaming path 86 containing the pre-encoded bit stream from the media player 66 may itself be assembled without transcoding into an MPEG2 transport stream by module 74, instead of using the frame buffer 54 input at data path 80. This may avoid first performing a decoding by the video decoder 68 and subsequent H.264 re-encoding by video encoder 72 prior to transport stream assembly. This may save power at the source 30. At the sink 32, the data may be decoded with a decoder that corresponds to the original pre-encoded format of the display data output from the media player 66, which may not be H.264 format. In this implementation, any encoding format is suitable, as long as the sink 32 comprises a compatible decoder, as determined by the source 30 during the query process described above. With reference to FIGS. 2 and 3 in this implementation, a limitation on the video decoder 98 may be that it be capable of decoding the original pre-encoded bit stream from the direct streaming path 86 of FIG. 2. At least two options for direct streaming may be utilized, RTSP based messaging and MPEG2-TS based messaging.

Figure 4:
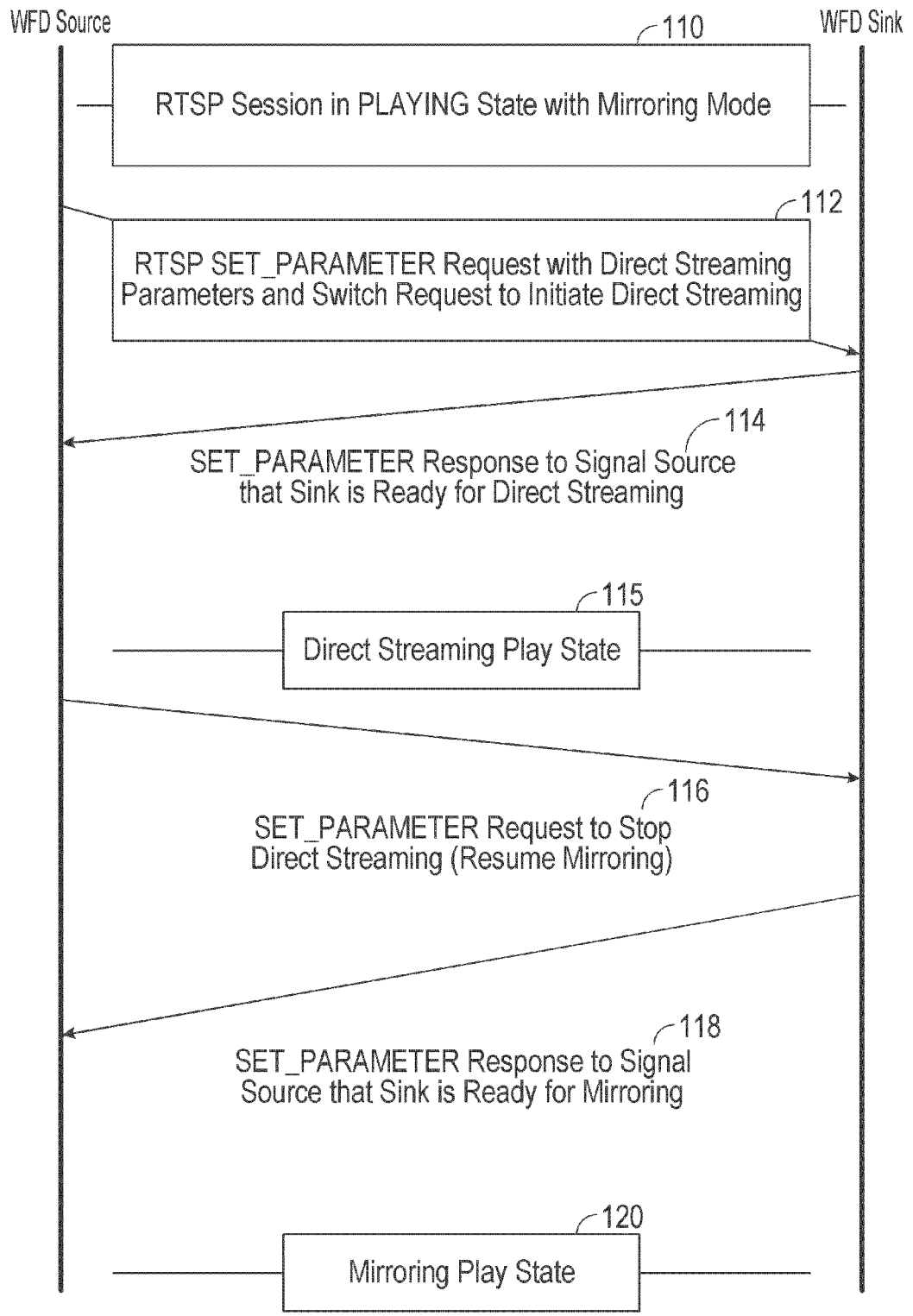
FIG. 4 is a sequence diagram illustrating one implementation of a message sequence for switching from mirroring to direct streaming.

RTSP based messaging is illustrated in FIG. 4. The system may begin in a display mirroring mode at state 110 where the image data is taken from the frame buffer 54 of the source 30, and is H.264 encoded at the source 30 and H.264 decoded at the sink 32 (e.g., utilizing the solid lines of FIGS. 2 and 3 as described above). This mode may require transcoding of the display data, as also described above. If a user of the source 30 selects to play a video clip stored on, generated by, or received by the source 30 in an encoding format for which the sink 32 includes a compatible codec, the source 30 may send an RTSP request message at state 112 to indicate that a stream switch from mirroring to direct streaming starts. When the sink 32 receives this request, at state 114 it may respond to the source 30 to change the bitstream from mirroring to direct streaming and prepares its decoder (e.g., the video decoder 140) for receiving the new bitstream on the TCP/UDP port that was negotiated, and informs the source 30 that it is ready for direct streaming. The source 30 on receiving the response from sink 32 may stop the mirroring bitstream and start streaming the bitstream contained in the video clip to the TCP/UDP port negotiated for this purpose, entering the direct streaming mode at state 115. If the user stops the clip or the clip reaches the end of the stream, at state 116 the source 30 may send an RTSP request to indicate that the direct streaming is ending, e.g., the stream switch from direct streaming to mirroring may start. When the sink 32 receives this request, at state 118 it may respond to the source 30 to change the bitstream from direct streaming to mirroring mode and prepare its decoder (e.g., the video decoder 140) for receiving the mirroring bitstream on the default port setup for the session. Upon receiving the response from the sink 32, the source 30 may enter the mirroring mode at state 120 and start streaming the mirroring bitstream to the default port. The default port may be defined based on the applicable protocol in use by the system (e.g., Miracast).

In another possible option for direct streaming, MPEG2-TS based messaging may be used, for example, when using a UDP transport port. In one aspect, if a user of the source 30 selects to play a video clip whose codec and profiles are supported by the sink 32, the source 30 may change the Program Association Table (PAT) and Program Map Table (PMT) such that it uses a different active Program number for transporting the new bitstream for Direct Streaming. When the sink 32 receives a new PAT and PMT, it may stop playing the mirroring bitstream and prepare its decoder (e.g., the video decoder 140) for receiving the new bitstream that continues to be received on the same UDP port that was used during mirroring. The source 30, after sending updated PAT and PMT, may start streaming the bitstream contained in the video clip to the same UDP port as the mirroring bitstream. If the user stops the clip or the clip reaches the end of the stream, the source 30 may change the PAT and PMT back to that of the mirroring Program Number as the active Program. When the sink 32 receives an updated PAT and PMT, it may stop playing the direct streaming bitstream and prepare its decoder (e.g., the video decoder 140) for receiving the mirroring bitstream that continues to be received on the same UDP port.

In the above described examples, the source 30 may determine that the current compression format of the video content is compatible with an existing codec on the sink 32. The source 30 may then send the video content in the original format, thereby avoiding a transcoding process. In some implementations, the channel state (or other information) may indicate that a different compression format may advantageously be used. Because the source 30 knows the codecs on the sink 32, it may choose a different compression format to use that is compatible with a different sink 32 codec. This may involve transcoding the original video content, but may improve video quality on the sink 32 depending on the channel state. As indicated above, a source (e.g., the source 30 of FIG. 1) may send overlay content to a sink (e.g., the sink 32 of FIG. 1) for display. For example, the source 30 may send overlay graphics including a video progress bar for the sink 32 to display over the top of the video content on the display. A desire to simultaneously transmit one or more overlay content(s) via a transmitter arises in many gaming and other usages of Wi-Fi display when higher visual quality is desired for displaying certain graphics or UI control information at desired locations of a display together with a regular video display. An ability to send overlay content along with video from the source 30 to sink 32 was not always supported in certain protocols (e.g., Miracast), which previously streamed video content using only a single format. Recent developments allow for overlay capability, which for example, allows a full screen in the frame buffer 54 of the source 30 to be encoded with the same video encoder regardless of the nature of the content in different parts of the display. Some extended systems flexibly enable multiple overlays and provide flexible overlay operations performed on the sink 32 side.

More specifically, referring back to FIGS. 2 and 3, intelligent overlay support may be provided using separate encoding processes with video encoders 72, 82, and 84 of FIG. 2 for different overlay components of each image frame 41. The encoded data for each overlay may be assembled into a single MPEG2 transport stream by module 74. The video encoders 72, 82, and 84 may be of the same or different format. When using encoding of different formats for different overlays, it is possible to achieve optimum performance, such as a lossless codec for graphics and UI and a lossy codec for video and other content for which lossy compression artifacts are not easily visible. Also, support for overlays allows sending only the incremental changes in frame buffer content for graphics, reducing the bandwidth requirement for high-resolution content display. Such extensions for certain protocols (e.g., Miracast) flexibly support multiple overlays, in which, the overlay content may be streamed to the sink 32, and displayed over a desired region of interest on the sink display 106. The overlay display content may use raw RGB or other lossless compression methods.

For example, on the sink 32 side, illustrated in FIG. 3, data in different portions of the MPEG2 transport stream may be extracted and routed to separate decoders 98, 140, 142, etc. that may decode the data streams separately according to the respective encoding methods performed on the source 30. For example, different portions of data may include an audio stream, a video stream (e.g., in WFD 1.0 Compatible Mode), an auxiliary stream, a raw RGB stream, a subtitles stream, etc. In one example, the auxiliary stream may include, for example, graphical overlays, which may be sent, for example, in separate MPEG2-TS streams instead of multiplexing with the audio or video streams. In one aspect, the graphical overlays may be sent in a separate stream when different transport ports are used, e.g., using a UDP port to send audio and video and a TCP for graphical overlays. In another aspect, the WFD framework may extract the overlays and send them to the sink 32 before video streaming begins. Different transport ports may be used, for example, when overlay graphics may be streamed without compression (e.g., sent raw), such as a 64×64 pixel cursor overlay graphic. Such content streams may further include timing logic, both of which may be generated by, for example, a media application. The overlay data (e.g., metadata) may then be blended on the sink 32 side by the Display Processor/Blender 102 according to control information that may be sent with the MPEG2-TS/RTP stream (as described further below) for populating the frame buffer 104 and presentation on the sink display 106.

Additional messaging and protocol extensions exist (e.g., in Miracast) to support streaming overlay(s) with the video data. Thus, during the direct streaming negotiation, the source 30 and sink 32 may exchange parameters to negotiate if the sink 32 can support overlays and what methods of blending the overlay content with the combined frame composition can be supported. Methods to multiplex and demultiplex (e.g., at an RTP port) the compressed or uncompressed (e.g., RGB) overlay frames and/or video frames into MPEG2-TS may be provided, and the video format supported for the overlay(s) e.g., RGB or Chroma formats or any specific codec format may be determined and negotiated.

For RTSP messaging, the source 30 may negotiate with the sink 32 for support of video codecs and capability information on whether the overlay is supported and how many overlays are supported. The source 30 may set parameters to choose codec types for the background frame and one for the overlays. In some examples, a maximum of two codec types may be allowed. For example the background may be encoded in JPEG and video overlay(s) may be encoded in H.264. Or both background and the overlays may be encoded in H.264. The source 30 may also set a parameter for the maximum number of overlays to be sent.

Direct streaming supporting multiple stream contents may save battery power (e.g., at the source 30) such that sending a stream in its native encoding format may eliminate a need to transcode (e.g., concurrently decoding and re-encoding) multimedia content. This may also preserve image quality of graphical contents and enhance user experience during streaming (e.g., in Miracast streaming). However, an interoperable solution across the source 30 and the sink 32 implementations may be beneficial to specify how these different streams should be multiplexed, packetized, and sent to the sink 32 with timing synchronization information. Such methods may enable the sink 32 to compose and display the content uniquely and unambiguously. Methods of multiplexing overlay contents at the source 30 to maintain timing synchronization to the primary display content are described below. The methods may further include control procedures on how the sink 32 may present the content for rendering based on the commands received from the source 30. The methods may further include specifications for pre-multiplied alpha blending (e.g., among other blending modes), such that the pre-multiplied alpha blending can be performed with or without constant alpha modulation.

Figure 5:
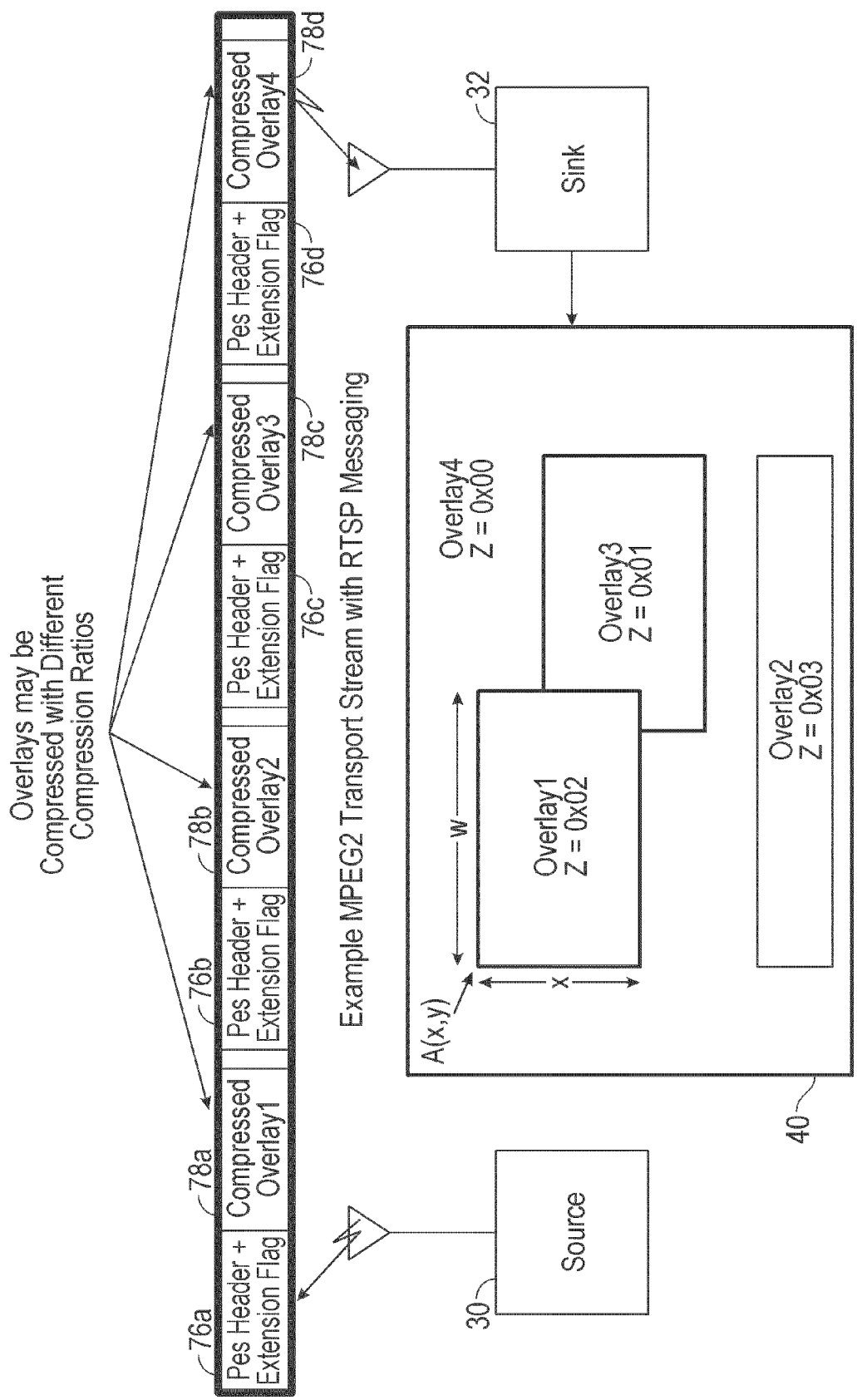
FIG. 5 illustrates one implementation of a transport stream in a video streaming system supporting overlay processing in the sink.

FIG. 5 illustrates one implementation of a transport stream in video streaming system (e.g., in an extended Miracast system using MPEG2-TS signaling) supporting overlay processing in a sink (e.g., the sink 32 of FIG. 1). As described above, to communicate various details about the display of overlay content, a source (e.g., the source 30 of FIG. 1) may send data to the sink 32 in packets (e.g., in a packetized elementary stream (or "PES") as implemented in MPEG2-TS).

In this example, each overlay may be preceded by properties describing the overlay in a Packetized Elementary Stream (PES) header (designated Packetized Elementary Stream (PES) header 76a, 76b, 76c, 76d, etc.). The overlay properties (or "overlay data") may also be referred to as metadata. Each header is followed by a corresponding overlay data packet 78a, 78b, 78c, 78d, etc. The PES header format in the MPEG2 transport stream is very flexible, allowing the creation of private data fields in the headers that can be used for system specific information transfer. The overlay properties included in the PES header may include top left coordinate (x,y) to mark the location of the overlay relative to the background. The coordinates may be in pixel locations with A=2 bytes for x and 2 bytes for y. For width and height of the overlay, W=2 bytes for width and H=2 bytes for height. The order in which the overlay is to blended to the background may also be provided, where a lower number indicates that the overlay should be blended first with Z=1 byte. 0x00 indicates background layer, and a value for Alpha may be provided where Alpha=1 byte.

Figure 6:
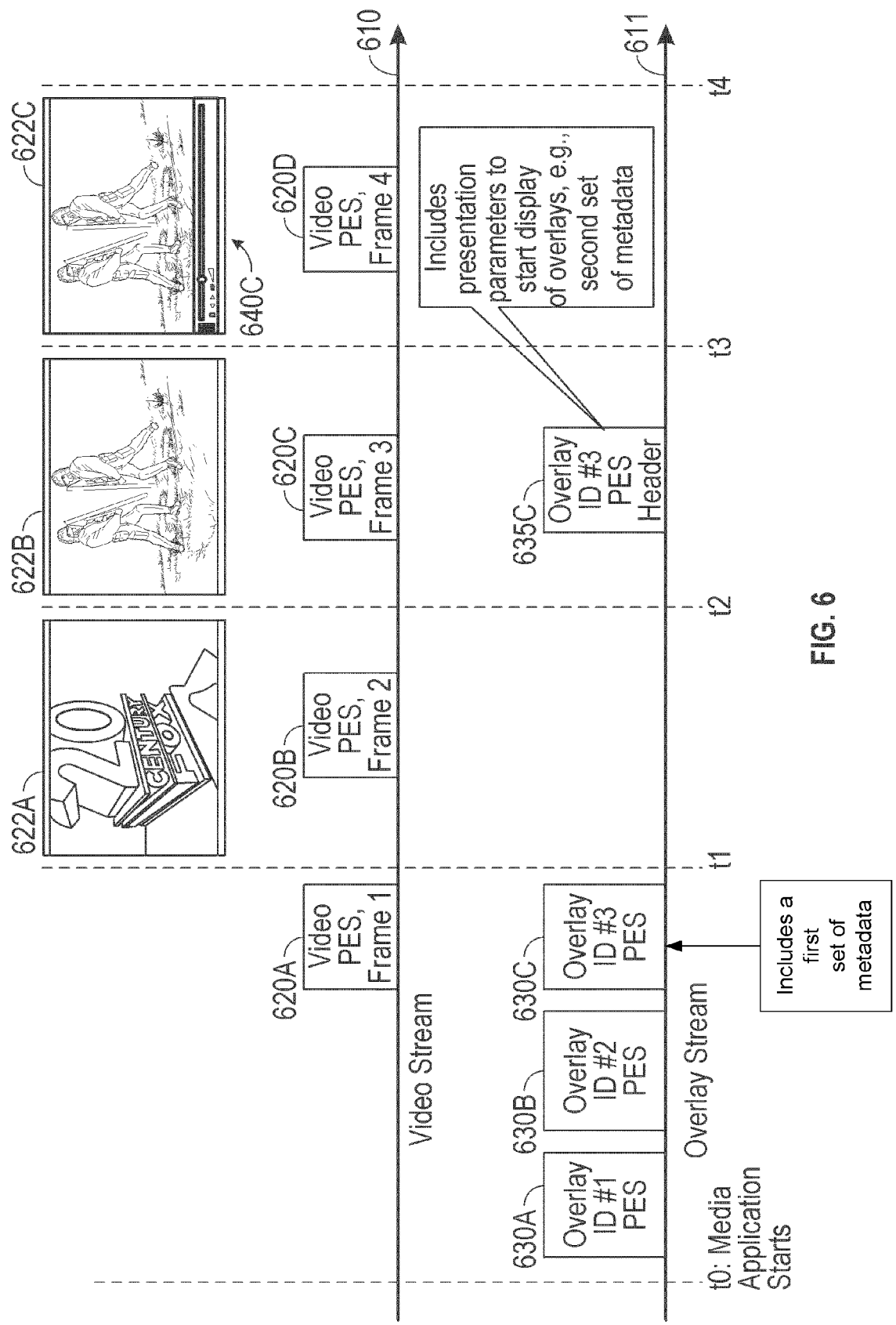
FIG. 6 illustrates an example of a sink implementing overlay presentation timing based on timing information received from a source.

FIG. 6 illustrates an example of a sink (e.g., the sink 32 of FIG. 1) implementing overlay presentation timing based on timing information received (e.g., in a PES header) from a source (e.g., the source 30 of FIG. 1). In one aspect, the timing information may comprise timing parameters and commands that indicate to the sink 32 when to start or stop presentation of one or more static or interactive graphics as related to, for example, MPEG2-TS. The static or interactive graphics may be based on various compression and/or lossless schemes, such as PNG, JPEG, HEVC, RGB, etc. As described further below, the source 30 may send graphical overlay contents to the sink 32 before a display time so that the sink 32 may pre-store the graphical overlay contents to be blended for display at a later time as necessary. In one aspect, each graphical overlay content or object may be tagged with a unique identifier (e.g., included in metadata) such that it may be associated with a set of presentation parameters to specify its characteristics to the sink 32. As further described below, in one aspect, the sink 32 may store the graphical overlay content and ignore an associated presentation time stamp, and/or the sink 32 may display the graphical overlay content continuously after reception (e.g., sticky image) until de-activated.

As illustrated in FIG. 6, the sink 32 may display content according to a video stream and an overlay stream, their time progression represented as horizontal timelines 610 and 611, respectively. The t0 dashed vertical timeline may represent a point in time at which the media application may start. Each successive dashed vertical timeline may represent a point in time at which a new video frame (e.g., video frames 622A, 622B, and/or 622C) may start. For example, at t1, video frame 1 (e.g., video frame 622A) may start. The source 30 may provide the sink 32 with video content (e.g., video frames 622A-C) in a number of video PESs 620A, 620B, 620C, 620D, etc. For example, the video PES 620C may comprise the video frame 622C, which the sink 32 may then display in the next video frame, in this example being the video frame 3 (e.g., video frame 622C) time portion, represented by t3.

The source 30 may also send PES information (e.g., in the overlay PESs 630A, 630B, and/or 630C) to the sink 32 including overlay graphics content (e.g., the overlay graphics content 640C). One example overlay graphics content 640C is shown at the bottom of video frame 622C as a video progress bar. In one aspect, the overlay PESs 630A-C may include instruction information, such that the sink 32 may determine to wait to display the overlay graphics content 640C until the sink 32 receives a further message from the source 30. For example, the source 30 may send the plurality of overlay PESs 630A-C to the sink 32 at a first time (e.g., at t0, before the video begins playing on the sink 32 at the application start time). In this example, the overlay PESs 630A-C may include instructions to store the overlay graphics contents 640C and wait to display them. In this example, the source 30 may later send an overlay PES header (e.g., the overlay PES header 635C), which may be a smaller (e.g., less bytes) message than any one of the overlay PESs 630A-C. In one aspect, the overlay PES header 635C may be smaller because it may not contain graphics data and/or payload data. In one non-limiting example, the overlay PES header 635C may only contain header information. In another non-limiting example, the overlay PES header 635C may also include per-pixel alpha channel data if the originally sent overlay graphics data did not carry such data. The overlay PES header 635C may include an instruction regarding when to display the associated overlay graphics content 640C, the association being determined by an overlay identification value as further described below. In the illustrated example, the sink 32 receives the overlay PES header 635C (e.g., which corresponds to the overlay PES 630C) during t2. Thus, as further described below, the sink 32 may display the overlay graphics content 640C (e.g., as associated with overlay PES 630C) during t3. In one aspect, the overlay PES header 635C may include further overlay information and/or metadata, e.g., an overlay identifier, an overlay location information, etc., as further described below. In one example, the overlay and presentation parameters are included in a Private Header field inside the PES payload field.

An example of a PES format including additional overlay information as described above is illustrated in Table 1 and further described below. In one non-limiting example, Table 1 may represent a PES structure and field values (e.g., including metadata) for an auxiliary stream carrying still-image overlay data (e.g., JPEG, PNG, RGB, HEVC, etc.). Some field values of Table 1 may include references to (note-1) and/or (note-2). Such references indicate, in the case of (note-1), that the associated field may appear when a PES_extension_flag is equal to 1, for example, when using High-Bandwidth Digital Content Protection (HDCP) 2.0/2.1 encryption. A reference to (note-2) indicates that the associated field may appear when the PES carries auxiliary stream data containing overlay graphics (e.g., data_present_flag=1), as further described below.

TABLE 1

| | | Field | # of bits | # of bytes | Value |
|---|---|---|---|---|---|
| PES Header | | packet_start_code_prefix | 24 | 3 | 0x00 00 01 |
| | | stream_id | 8 | 1 | 0b10111101 [private stream1] |
| | | PES_packet_length | 16 | 2 | Variable |
| | | '10' | 2 | 1 | 0b10 |
| | | PES_scrambling_control | 2 | | 0b00 [not scrambled] |
| | | PES_priority | 1 | | 0b0 [no priority] |
| | | data_alignment_indicator | 1 | | 0b1 |
| | | Copyright | 1 | | 0b0 [not defined] |
| | | original_or_copy | 1 | | 0b1 (original) or 0b0 (copy) |
| | | PTS_DTS_flag | 2 | 1 | 10b [present] |
| | | ESCR_flag | 1 | | 0b0 [not present] |
| | | ES_rate_flag | 1 | | 0b0 [not present] |
| | | DSM_trick_mode_flag | 1 | | 0b0 [not present] |
| | | additional_copy_info_flag | 1 | | 0b0 [not present] |
| | | PES_CRC_flag | 1 | | 0b0 [not present] |
| | | PES_extension_flag | 1 | | 0b0: if HDCP 2.0/2.1 is not used<br>0b1: if HDCP 2.0/2.1 is used |
| PES Header Cont . . . | | PES_header_data_length | 8 | 1 | 0x07: if HDCP 2.0/2.1 is not used<br>0x18: if HDCP 2.0/2.1 is used |
| | | '0010' | 4 | 5 | 0b0010 |
| | | PTS[32 . . . 30] | 3 | | shall be set to correct value |
| | | marker_bit | 1 | | 0b1 |
| | | PTS[29 . . . 15] | 15 | | shall be set to correct value |
| | | marker_bit | 1 | | 0b1 |
| | | PTS[14 . . . 0] | 15 | | shall be set to correct value |
| | | marker_bit | 1 | | 0b1 |
| | | PES_private_data_flag | 1 | 1 | 0b1 [present] (note-1) |
| | | pack_header_field_flag | 1 | | 0b0 [not present] (note-1) |
| | | program_packet_sequence_counter_flag | 1 | | 0b0 [not present] (note-1) |
| | | P-STD_buffer_flag | 1 | | 0b0 [not present] (note-1) |
| | | Reserved | 3 | | 0b111 (note-1) |
| | | PES_extension_flag_2 | 1 | | 0b0 [not present] (note-1) |
| | | PES_private_data | 128 | 16 | HDCP 2.0/2.1 counter values and marker_bit. (note-1) |
| | | stuffing bytes | 16 | 2 | 0xFF FF |
| PES Payload | Private Header | Overlay_ID | 8 | 1 | Unique identifier to represent each overlay layer |
| | | presentation_mode | 2 | 1 | 0b00: passive or deferred presentation (presentation to be suspended if already active)<br>0b01: active or immediate presentation as indicated by the PTS<br>0b10: deactivate presentation (cancel the presentation resources for this overlay)<br>0b11: reserved (note-2) |
| | | data_present_flag | 1 | | 0b0: the Graphics data field is empty (Graphics data for the overlay ID was already sent in earlier PES packets)<br>0b1: Graphics data is included (note-2) |
| | | Reserved | 5 | | |
| | | overlay_pos_top_left_x | 16 | 2 | X coordinate of the Graphic object's top-left corner (note-2) |
| | | overlay_pos_top_left_y | 16 | 2 | Y coordinate of the Graphic object's top-left corner (note-2) |
| | | overlay_width | 16 | 2 | Width of the Graphics image in number of pixels (note-2) |
| | | overlay_height | 16 | 2 | Height of the Graphics image in number of pixels (note-2) |
| | | overlay_z_layer | 8 | 1 | Z-order of the Graphics image for blending (note-2) |
| | | blend_alpha_selection | 4 | 2 | The type of alpha to be used for blending the overlay Graphics<br>0b0000: constant alpha<br>0b0001: per-pixel source alpha (foreground alpha)<br>0b0010: per-pixel destination alpha (background alpha) |

TABLE 1-continued

| Field | # of bits | # of bytes | Value |
|---|---|---|---|
| | | | 0b0011: per-pixel source alpha with constant alpha modulation |
| | | | 0b0100: per-pixel destination alpha with constant alpha modulation |
| | | | 0b0101-0b1111: reserved (note-2) |
| blend_mode_selection | 4 | | The blending mode to be used to composite the overlay Graphics |
| | | | 0b0000: no blending (Alpha = 0) |
| | | | 0b0001: normal alpha blending (Eqn. 1) |
| | | | 0b0010: reverse alpha blending (Eqn. 2) |
| | | | 0b0011: pre-multiplied alpha blending (Eqn. 3 or 4) |
| | | | 0b0100-0b1111: reserved (note-2) |
| constant_alpha_flag | 1 | | 0b0: constant alpha data is not included in the PES |
| | | | 0b1: constant alpha is included (note-2) |
| per_pixel_alpha_info | 2 | | 0b00: per pixel alpha is not present |
| | | | 0b01: straight per pixel alpha is embedded in the Graphics (not pre-multiplied) |
| | | | 0b10: pre-multiplied per pixel alpha is embedded in the Graphics |
| | | | 0b11: the PES data includes the per pixel alpha data at the offset indicated by perpixel_alpha_pointer (note-2) |
| color_bitwidth | 5 | | Indicates the bit width of the color and any alpha channel present in the Graphics data |
| constant_alpha_value | 8 | 1 | Alpha value of the image for blending that will be applied for the whole plane of this overlay graphics (note-2) |
| perpixel_alpha_pointer | 16 | 2 | Offset in terms of number of bytes after which alpha plane is present in the Graphics Data field (note-2) |
| Data | Graphics Data | vary | vary | vary (each column in the Graphics Data row is variable) |

The source 30 may generate a PES including one or more of the fields as described in Table 1. For example, the PES may include PES Header and PES Payload portions. The PES Payload portion may further include Private Header (e.g., for overlay parameters) and Data (e.g., for overlay graphics ("Graphics Data")) portions. In one aspect, the Private Header portion may comprise 16 octets. The Private Header portion may be present even when the Graphics Data portion is empty. In one aspect, the PES Payload portion may further include an Overlay Alpha Channel Data portion, as further described below. Each of the PES Header, Private Header, and/or Data portions of the PES may further include parameter fields, each parameter comprising a number of bits, a number of bytes, and one or more values. For example, the packet start code prefix parameter within the PES Header portion may comprise 24 bits, 3 bytes, and a value of 0x00 00 01.

Referring now back to FIG. 6 with respect to Table 1, the plurality of overlay PESs 630A-C may comprise at least a PES Payload associated with their respective corresponding overlay graphics content (e.g., the overlay graphics content 640C). The overlay graphics content 640C may comprise a video progress bar, a logo, a pause button, a play button, subtitles (e.g., when sent as graphics data), or any other type of overlay graphics content. For example, the overlay PES 630C may comprise a PES Payload associated with overlay graphics content 640C (a video progress bar in this example), which may be in the Data portion of the PES Payload. The PES Payload and/or the PES Header may further comprise various parameters (e.g., in the Private Header) with respect to the associated overlay graphics content 640C. As described further below, the Private Header may include, for example, an associated overlay identifier, a width and height of a pixel, an indication of an alpha selection, a constant alpha (and/or whether to use a constant alpha), a sending mode of a per-pixel alpha (if any), a desired blending mode, a presentation mode, and/or any other presentation commands and/or timing information and/or metadata.

The Private Header may include an Overlay_ID parameter, which may provide a unique 8-bit identifier to represent an associated overlay. The sink 32 may use the Overlay_ID to identify the associated overlay graphics content (e.g., the overlay graphics content 640C) when the source 30 instructs the sink 32 to display the overlay, e.g., as instructed by the associated overlay PES Header (e.g., the overlay PES header 635C). For example, the Overlay PES 630C may include an Overlay_ID parameter with a value that corresponds to the overlay associated with overlay graphics content 640C. In this way, the Overlay_ID parameter may uniquely represent each overlay content such that the sink 32 may allocate an overlay layer for the associated content and perform blending of the display as necessary.

The Private Header may further include a presentation_mode parameter, which may include one of a number of possible values, each instructing the sink 32 to treat the associated overlay graphics content (e.g., the overlay graphics content 640C) in a different way. For example, the presentation_mode parameter may, in one aspect, comprise a 0b01 value, which may instruct the sink 32 to display the associated overlay graphics content 640C according to a presentation time stamp ("PTS"). For example, the sink 32 may refer to the PTS field in the associated PES Header (e.g., the overlay PES header 635C) to determine when to display the associated overlay graphics content 640C, which in one aspect, may be immediately. This presentation mode may be referred to as an active mode or an enable mode, for example. In the illustrated example, the Overlay PES Header 635C may comprise a presentation_mode value of 0b01, such that the sink 32 may then display the associated overlay graphics content 640C according to the associated PTS values.

In one embodiment, the presentation_mode parameter may instead include a value 0b00, which may instruct the sink 32 to follow a passive ("deferred") presentation mode. This mode may be used, for example, when overlay content is static (e.g., when it is beneficial for the sink 32 to store the overlay content in its allocated buffer/layer). In this mode, the sink 32 may ignore the associated PTS fields and/or position information fields (if any are present). Instead, the sink 32 may store the associated overlay graphics content 640C for display at a later time. In one aspect, the overlay PES 630C may be inferred to comprise a presentation_mode parameter with a value of 0b00, because the sink 32 waits to display the associated overlay graphics content 640C. In this example, the sink 32 may wait to display the associated overlay graphics content 640C until it receives the associated overlay PES Header 635C, as further described below. In one aspect, the sink 32 may store the overlay graphics content 640C while it waits for display instructions, such that the source 30 will not be required to resend the overlay graphics content 640C at the time for display. In one aspect, the source 30 may send instructions (e.g., resend the associated PES Header 635C) to display the overlay graphics content 640C more than once (e.g., each time the video progress bar is to be shown), each without a requirement to resend the overlay graphics content 640C. In this way, bandwidth and storage requirements may be reduced, such that the source 30 may no longer be required to store and/or transmit the overlay graphics content 640C after an initial transmission.

In another aspect, the presentation_mode parameter may comprise a 0b10 value, which may instruct the sink 32 to deactivate presentation of the associated overlay graphics content 640C and/or remove the associated overlay graphics content 640C from its storage. In this deactivate presentation_mode, the sink 32 may temporarily suspend or permanently cancel the presentation resources for the associated overlay based on the included Overlay_ID parameter value.

The Private Header may further include a data_present_flag, whose value may indicate to the sink 32 whether overlay graphics data is present in the Data portion of the PES, e.g., in the Graphics Data portion. When the source 30 sends a PES packet for a given overlay ID for the first time (as associated with an Overlay_ID), the data_present_flag may be set to indicate that the PES Payload contains the overlay graphics data. That is, the Graphics Data field may include the overlay graphics content 640C associated with the Overlay_ID and may also include any optional alpha channel data associated with the graphics, as further described below. For example, the data_present_flag of the Overlay PES 630C may comprise a value of 0b1, because the Overlay PES 630C (in this example) includes the associated overlay graphics content 640C. In this example, the Overlay PES Header 635C may comprise a value of 0b0, because the Overlay PES Header 635C (in this example) does not include the associated overlay graphics content 640C (e.g., because it is already stored at the sink 32).

In one aspect, the Private Header may further include overlay location parameters, which the sink 32 may use to determine where on the video frame (e.g., video frames 622A-C) to place the associated overlay graphics content 640C. For example, overlay_pos_top_left_x and overlay_pos_top_left_y may indicate an x-and-y coordinate (respectively) for a starting point of the associated overlay image in a number of pixels relative to a resolution used for the background. In one aspect, the background may be in a full-screen format. As another example, overlay_width and overlay_height may indicate a width and height (respectively) of the overlay image in a number of pixels. As another example, overlay_z_layer may indicate an order in which the overlay image is to be blended to the background or a base layer, such as for generating a stacking layer order for blending multiple overlays that may be active at the same time.

In one aspect, the Private Header may include further blending parameters, which the sink 32 may use to determine various blending and/or alpha settings for blending the overlay graphics content 640C. For example, the blending settings may include configurations such that the sink 32 may blend to a desired location and a desired time with a desired blending mode. For example, a blend_alpha_selection parameter value may indicate an alpha type to be used for blending the overlay graphics content 640C. That is, the parameter may indicate whether, for example, the per pixel alpha or constant plane alpha (or both) may be used for blending. In the case of a per pixel alpha, the per pixel alpha may be selected from an alpha of the source 30 (e.g., foreground) or the sink 32 (e.g., background) layers for blending the associated overlay graphics. For example, a value of 0b0000 may indicate a constant alpha type. A blend_mode_selection parameter value may indicate a blending mode to be used to composite the overlay graphics, as further described below. For example, a value of 0b0000 may indicate that no blending may occur, such that Alpha may be equal to 0. As another example, a value of 0b0011 may indicate a pre-multiplied alpha blending mode, as further described below. The Private Header may include further blending parameters, for example, a constant_alpha_flag parameter value may indicate whether a constant alpha is included in the PES and a perpixel_alpha_flag may indicate whether the PES packet includes alpha channel data for the overlay graphics (e.g., which may further indicate whether a perpixel_alpha_pointer field is present). Further, a perpixel_alpha_info may indicate whether the per pixel alpha is available for the graphics and how it is sent, for instance, it may indicate whether the per pixel alpha is embedded in the Graphics Data in straight form, pre-multiplied form, and/or separately attached in the PES packet. In one aspect, if this field is set as 0b11, then the perpixel_alpha_pointer field may be present. Further, a color_bitwidth may indicate a bit width of a pixel color and any alpha channel that may be present in the Graphics Data field and a constant_alpha may indicate a value of a constant alpha for blending when a blend_alpha_selection indicates a use of a constant alpha during blending. Further, a perpixel_alpha_pointer may indicate a position at which the per pixel alpha channel data may be included in the payload data, that is, it may provide a relative offset in terms of the number of bytes in the start of the payload data at which the alpha channel data starts. In one aspect, this field may be present when the perpixel_alpha_flag is set. Other parameter indication examples may further include (non-exhaustively) a per pixel alpha from a foreground or background layer, whether modulation with constant_alpha may be used, whether a per-pixel alpha may be attached to graphics data (e.g., such that the alpha channel data may be carried by the PES payload), and so on as shown in Table 1.

As described above, the Private Header may indicate a selected blending mode, e.g., in the blend_mode_selection parameter. The selected blending mode could be, for example a "Normal alpha blending mode," a "Reverse alpha blending mode," a "Pre-multiplied alpha blending mode," etc. In one aspect, any existing per-pixel alpha channel data for an overlay may be embedded directly into the graphics content (e.g., for PNG encoded images). In another aspect, the per-pixel alpha channel data for an overlay may be carried separately as part of the PES Payload. Further, in one example, a perpixel_alpha_pointer parameter may be used to provide an offset after which the alpha data may be present.

Each blending mode may comprise a different blending equation (e.g., for presenting the associated overlay content). The Normal, Reverse, and Pre-Multiplied alpha blending mode equations may be represented by Equations 1-4, respectively.

$$\text{Pixel}_{Output} = \alpha_{selected} * \text{Pixel}_{Src} + (1 - \alpha_{selected}) * \text{Pixel}_{Dest} \quad \text{(Eqn. 1)}$$

$$\text{Pixel}_{Output} = (1 - \alpha_{selected}) * \text{Pixel}_{Src} + \alpha_{selected} * \text{Pixel}_{Dest} \quad \text{(Eqn. 2)}$$

$$\text{Pixel}_{Output} = \text{Pixel}_{Src} + (1 - \alpha_{selected}) * \text{Pixel}_{Dest} \quad \text{(Eqn. 3)}$$

$$\text{Pixel}_{Output} = \alpha_{CONSTANT} * \text{Pixel}_{Src} + (1 - \alpha_{CONSTANT}) * (1 - \alpha_{selected}) * \text{Pixel}_{Dest} \quad \text{(Eqn. 4)}$$

where $\alpha_{selected}$ indicates a selected alpha value blending of each pixel $$\text{color, where: } \alpha_{selected} = \begin{cases} \alpha_{CONSTANT} & \text{if } 0b0000 \\ \alpha_{SRC} & \text{if } 0b0001 \\ \alpha_{DEST} & \text{if } 0b0010 \\ \alpha_{CONSTANT} \cdot \alpha_{SRC} & \text{if } 0b0011 \\ \alpha_{CONSTANT} \cdot \alpha_{DEST} & \text{if } 0b0100 \end{cases}$$

In the Normal alpha blending mode (Eqn. 1), pixel color data may not be pre-multiplied with alpha, such that the selected alpha (e.g., per pixel or constant alpha) may be applied to the source 30 pixel (e.g., foreground). Further, 1-alpha may be applied to the sink 32 pixel colors (e.g., background). This mode may also be referred to as (ALPHA, ONE_MINUS_ALPHA) blending mode.

In the Reverse alpha blending mode (Eqn. 2), pixel color data may not be pre-multiplied with alpha, such that the 1-selected alpha may be applied to the source 30 pixel (e.g., foreground) and the selected alpha may be applied to the sink 32 pixel colors (e.g., background). This mode may also be referred to as (ONE_MINUS_ALPHA, ALPHA) blending mode.

In the Pre-multiplied alpha blending mode (Eqn. 3), the alpha may be pre-multiplied into an image (e.g., Graphics Data pixel data) at the source 30. This may reduce multiplication requirements at the sink 32, for example, it may eliminate any further multiplication requirements at the sink 32. In one aspect, the sink 32 may still perform multiplication in regard to a destination pixel. For example, the sink 32 may still add the source 30 pixel colors (e.g., foreground) with 1-alpha as applied to the sink 32 pixel colors (e.g., background) as per one or more of Equations 3 or 4. For example, when the blend_alpha_selection field is set to 0b0000 (e.g., α_CONSTANT) or to 0b0001 (e.g., α_SRC), Equation 3 may be used. As another example, when the blend_alpha_selection field is set to 0b0011 (e.g., per pixel source alpha with constant alpha modulation), Equation 4 may be used. The Pre-multiplied alpha blending mode may also be referred to as (ONE, ONE_MINUS_ALPHA) blending mode. In one non-limiting example, when the blend_mode_selection parameter indicates the pre-multiplied alpha blending mode, the blend_alpha_selection field may not be set to 0b0011 or 0b0100.

In one embodiment, the sink 32 may support one or more overlay presentation modes and/or comprise a limit to a number of overlay components supported, each of which the source 30 and the sink 32 may pre-negotiate to determine functionality. Overlay presentation modes may include, for example a basic mode and/or an extended mode. In the utilization of the above-described methods, some overlays may be presented using the basic mode, while others may be presented using the extended mode, depending on a variety of factors. In one non-limiting example, the extended mode may be used for presentation of pre-rendered overlay content (e.g., an icon), while the basic mode may be used for dynamically rendered overlay content (e.g., loading animations).

In the basic mode, the source 30 may use its application to composite an overlay layer, sending the composited overlay graphics to the sink 32 for display. In this mode, the source 30 may send the overlay layer each time any portion of the overlay layer is updated (e.g., when a progress indicator of a progress bar moves); therefore, this mode may consume high bandwidth for real-time transfer when graphic sizes are large. In the basic mode, the sink 32 may blend the composited overlay layer immediately upon receipt based on the associated PTS information. Therefore, the sink 32 may require a single overlay buffer allocation in the basic mode, and this mode may save on memory for pre-storing overlays at the sink 32. The basic mode may utilize the active presentation mode as described above, but, in some aspects, may not utilize the passive presentation mode.

In the extended mode, the source 30 may send individual graphics objects for different regions of overlay graphics to the sink 32 prior to starting an application on the source 30, e.g., such that the graphical overlays may be cached on the sink 32. In this mode, the sink 32 may reserve a buffer for each overlay component using unique identifiers (e.g., included in metadata), such as the Overlay_ID parameter as described above (e.g., Overlay_ID #1, ID #2, . . . , ID #N). In this mode, the source 30 may send all or part of the overlay components and request that the sink 32 store them in its buffer. The source 30 may then send parameters to the sink 32 such that the sink 32 may composite each overlay component and/or layer according to the parameters. In this way, each of the overlay objects may be dynamically selected by the source 30 by sending commands as needed. The extended mode may be more flexible than the basic mode, such that it may utilize the active presentation mode, the passive presentation mode, the deactivate presentation mode, etc. as described above. Furthermore, in some aspects, this mode may allow for graphical overlays to be rendered dynamically (e.g., on-the-fly).

In another embodiment, user interaction may start or stop the display of overlay content (e.g., user interface "UI" graphics) at the sink 32. A user may start or stop the display of overlay content (e.g., a video progress bar) through a user interface of an application at the source 30 and/or the sink 32. For example, the user may click to pause or forward/reverse video playback using a mouse, a remote device, etc. When using the UI at the sink 32 to trigger activation of an overlay for the source 30, user input (e.g., location input) may first be sent from the sink 32 to the source 30 using User Input Back Channel (UIBC), where the source 30 may then calculate updated UI graphics. For example, previous UI graphics may comprise a play button overlay graphic, while the updated UI graphics may comprise a pause button overlay graphic. In one aspect, the source 30 and/or the sink 32 may accommodate for expected delay from the user interaction to the delivery of the updated UI graphics. In another aspect, UI graphics may be switched on or off based on user involvement. Having calculated the updated UI graphics, the source 30 application may then determine which overlay components to utilize in updating the overlays at the sink 32. Then the source 30 may generate the PES packets and send them (e.g., using MPEG2-TS) to the sink 32. In one aspect, the PES packets for overlay components may contain presentation commands to reflect the recent user interaction. For example, using the methods as described above, the sink 32 may store certain UI graphics (e.g., a pause button overlay graphic, a play button overlay graphic, etc.) as received from the source 30 in the PES. Based on user interaction, the source 30 may send a PES (e.g., a PES header not including the overlay graphics data) including an instruction to display the appropriate UI graphic content. As described above, such methods may reduce storage and bandwidth requirements. In one aspect, certain UI graphic overlay content may be associated with certain application identification standards (e.g., Miracast), such that the source 30 application may identify a type of user interaction when it receives data over the UIBC.

In another embodiment, one or more of the above commands and/or parameters related to overlays may be specified using Program Specific Information (PSI). For example, a private section table may be included as PSI if user interaction and/or the application triggers sending a command to activate or deactivate an overlay object. In one aspect, the private section table may be sent in a periodic interval (e.g., every 50 ms, every 100 ms, or at an irregular interval) using a MPEG-TS packet with a packet ID (PID) set as a PSI.

Figure 7:
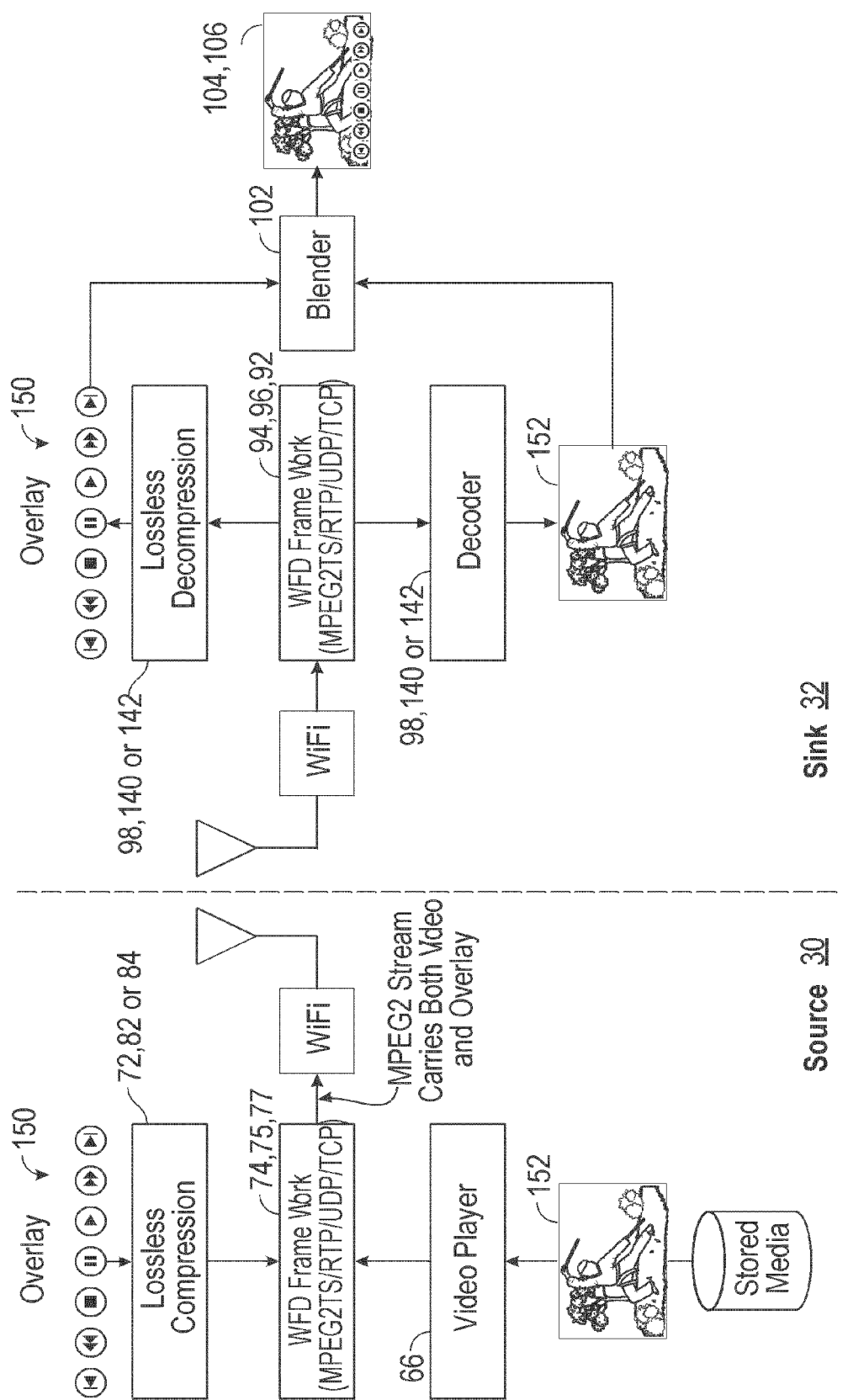
FIG. 7 is a block diagram of one implementation of a video streaming system supporting overlay processing in the sink.

FIG. 7 illustrates a specific overlay streaming example. In this example, a foreground overlay 150 and a background video stream 152 may be processed separately and then combined. For example, the foreground overlay 150 may comprise the overlay graphics content 640C of FIG. 6, and the background video stream 152 may comprise the video frame 622C of FIG. 6. The foreground overlay 150 may be generated by the video player 66, a different application program 62 or 64 on the source 30 as shown in FIG. 2, or an operating system of the source 30. The illustrated example demonstrates video data being streamed in its pre-encoded state without transcoding. The overlay may be encoded with a different lossless compression encoding. The foreground overlay 150 and the background video stream 152 may be packetized in the WFD Frame Work (e.g., Miracast) at 74, 75, 77. The foreground overlay 150 in the background video stream 152 may then be transmitted (e.g., over Wi-Fi) to the sink 32. On the sink 32 side, the MPEG2-TS/RTP stream may be unpacked, and the two data sets may be decoded and/or decompressed separately for blending at the Display Processor/Blender 102 according to the overlay information provided in the MPEG2-TS/RTP stream. The system may then combine (e.g., composite) the foreground overlay 150 with the background video stream 152 to form a final picture for display as shown on the furthest right side of FIG. 7.

Figure 8:
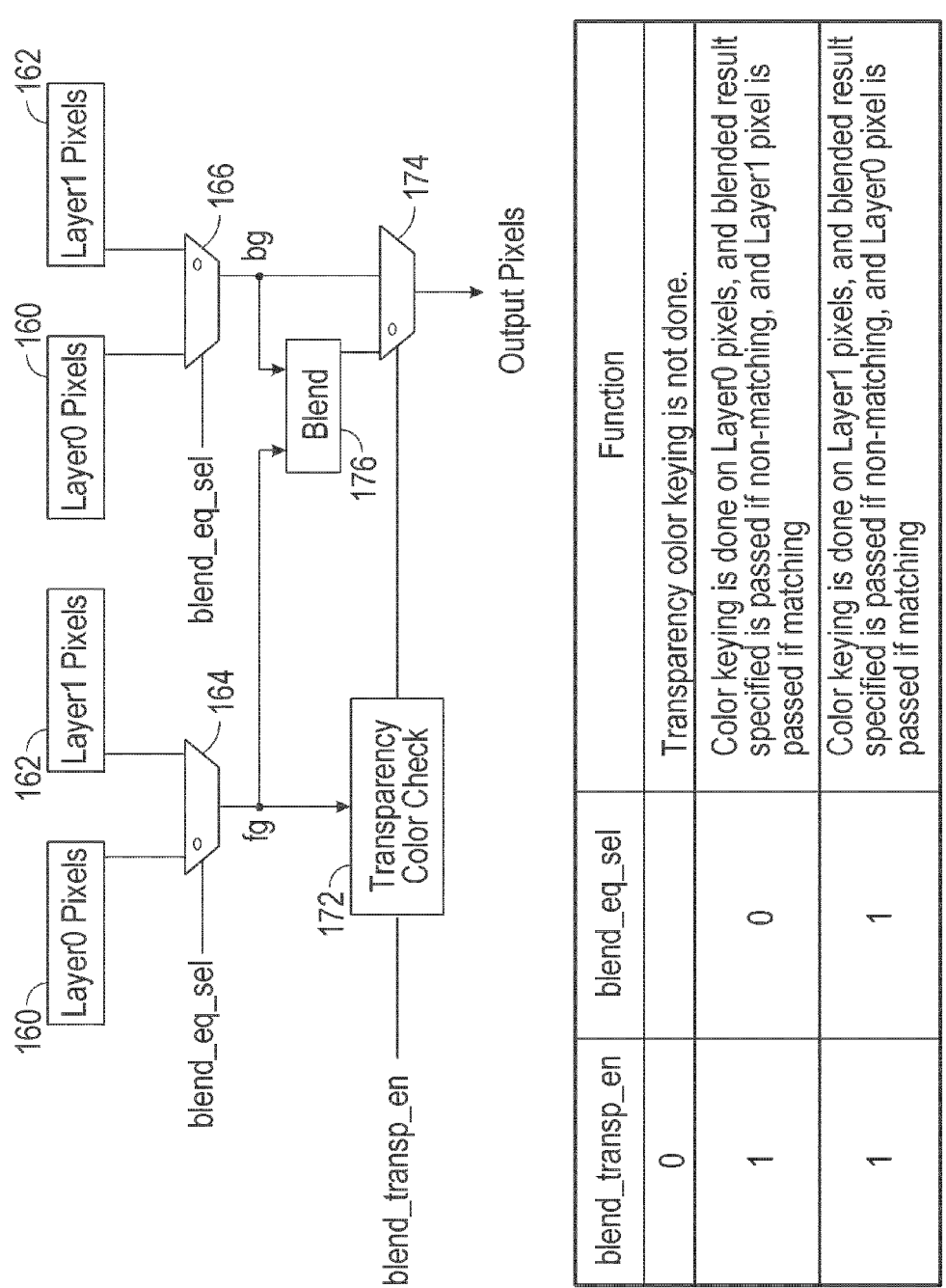
FIG. 8 is a block diagram of one implementation of a blending module in a sink of a video streaming system supporting overlay processing in the sink.

FIG. 8 illustrates a functional block diagram of a specific blend algorithm being applied at the sink 32 (e.g., at the Display Processor/Blender 102 of FIG. 7) between the composited background layer and the foreground (overlay). For example:

$$\text{Blended pixel} = \text{Alpha} * \text{Pixel}_{FG} + (1-\text{Alpha}) * \text{Pixel}_{BG}$$

Final pixel=Foreground pixel if transparency check using color key passes else Final pixel=Blended pixel As illustrated, pixels of an overlay Layer0 (e.g., overlay layer 160) may be processed with corresponding pixels of a different overlay Layer1 (e.g., overlay layer 162). A selection signal blend_eq_sel may determine which overlay is foreground, and which is background using multiplexers 164 and 166. Another control signal blend_transp_en may determine whether a transparency color check is performed at block 172. If the transparency color check passes, the background pixel may be output from multiplexer 174, otherwise, a blended pixel from block 176 may be output from multiplexer 174 to the frame buffer 104 of the sink 32 for display at that pixel location. The parameters for the blend equation implemented in block 176 and the status of the control signals may be controlled by the information sent from the source 30 on the MPEG2 transport stream.

For example, the sink 32 may wait to receive the background layer, which may be marked by Z=0x00 in this example, and the overlay count to match total overlay (e.g., negotiated at startup) before the blend operation begins. The background layer may be larger than the overlays in width and height and match the negotiated display resolution of the sink 32. If there were no succeeding overlays received after receiving Z=0x00 and a presentation timeout time is exceeded, then the overlay process may be terminated and the frame may be shipped out to the display for rendering. The presentation timeout time may be based on the received frame rate. For example, if the frame rate of the display data being received is 30 fps, the presentation time out may be about 33 msec.

During a sessions in certain protocols (e.g., Miracast), for example, any number of overlays might start at any instant of time as far as they do not exceed the maximum number of overlays that were negotiated at startup. Each overlay may have its own elementary stream based on the negotiated codec e.g., JPEG, H.264. A Program Map Table (PMT) for the MPEG2 transport stream may be updated each time there is an elementary stream added or removed from the program that carries an overlay. If a new elementary stream is added, then successive MPEG2 transport packets may contain PES packets for the new elementary stream. Each elementary stream may carry certain details of the overlay, so the Display Processor/Blender 102 on the sink 32 may compose the final frame to be rendered. A new PES_extension_flag may be used to indicate the presence of overlay information in the PES. A new field may be added in the PES packet to carry overlay information in PES including the coordinates, width, height, Z order, alpha value, color key and blending equation. This information may be passed to the Display Processor/Blender 102 on the sink 32 for generating the final frame to be rendered.

As described above, in some implementations, an extension of certain protocols (e.g., Miracast) may negotiate mutual capabilities including the supported codec parameters and/or the option of the sink 32 creating a TCP port for use during direct streaming. Another extension may support switching of bitstreams during playback using RTSP based and MPEG2-TS based approaches depending upon the latency vs. roubustness requirements (e.g., if to use TCP or UDP). Another extension may support multiple overlays being sent over the session and the sink 32 may render the combined frame composition using the pre-negotiated video formats and blending modes including overlay signaling over RTSP, overlay blending techniques, and PES information for overlay transport.

FIG. 9A is a flowchart of an overlay handling process in a sink (e.g., the sink 32 of FIG. 1). At block 902, the sink 32 may wirelessly receive one or more overlays. At block 904, the sink 32 may wirelessly receive metadata that includes an identifier for each of the overlays. At block 906, the sink 32 may store, based on a value of the metadata, the overlays in association with their respective identifier. At block 908, the sink 32 may receive metadata containing the identifier of one of the stored overlays. At block 910, the sink 32 may retrieve and display the stored overlay.

FIG. 9B is a flowchart of an overlay handling process in a source (e.g., the source 30 of FIG. 1). At block 920, the source 30 may wirelessly transmit one or more overlays. At block 922, the source 30 may wirelessly transmit metadata that includes an identifier for each of the overlays. At block 924, the source 30 may instruct the sink 32 to selectively store, based on a value of the metadata, each of the overlays in association with their respective identifier. At block 926, the source 30 may instruct the sink 32 to retrieve and display one of the overlays.

Figure 10:
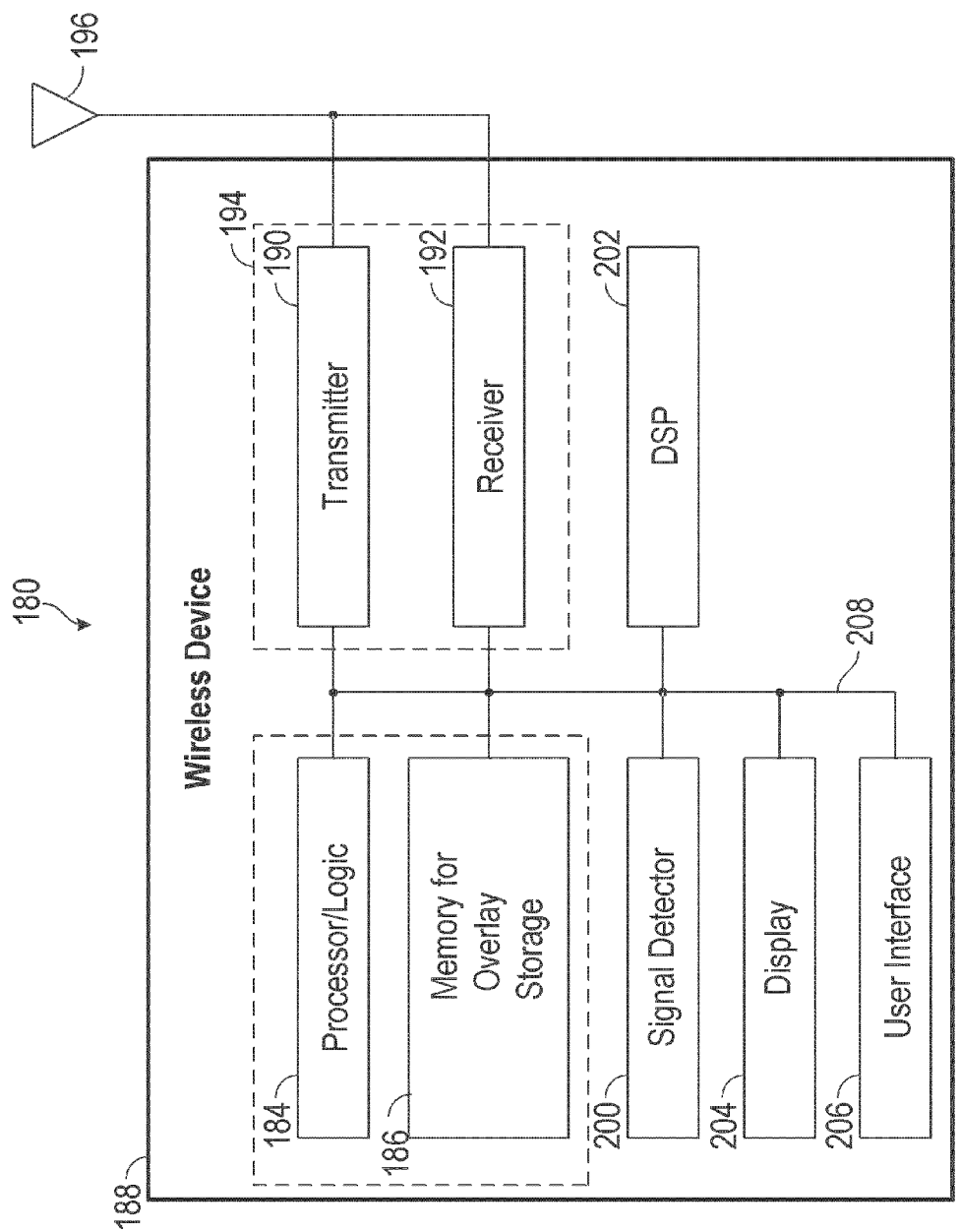
FIG. 10 is a block diagram of one implementation of a source or a sink.

FIG. 10 illustrates various components that may be utilized in a wireless device 180 that may be employed within the wireless communication system described above. The wireless device 180 is an example of a device that may be configured to implement the various methods described herein.

The wireless device 180 may include a processor 184 which controls operation of the wireless device 180. The processor 184 may also be referred to as a central processing unit (CPU). Memory 186, which may include both read-only memory (ROM) and random access memory (RAM), provides instructions and data to the processor 184 and in the sink (e.g., the sink 32 of FIG. 1) may be used to store the overlay data (or "overlay properties" or "metadata") in accordance with the principles described above. A portion of the memory 186 may also include non-volatile random access memory (NVRAM). The processor 184 generally performs logical and arithmetic operations based on program instructions stored within the memory 186. The instructions in the memory 186 may be executable to implement the methods described herein. For example, depending on whether the device is the source 30, the sink 32, or both, the blocks of FIGS. 1, 2, and 3 may be implemented with the processor 184 and the memory 186. The processor 184 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 180 may also include a housing 188 that may include a transmitter 190 and a receiver 192 to allow transmission and reception of data between the wireless device 180 and a remote location. The transmitter 190 and receiver 192 may be combined into a transceiver 194. An antenna 196 may be provided and electrically coupled to the transceiver 194. The wireless device 180 may also include (not shown) multiple transmitters, multiple receivers, multiple transceivers, and/or multiple antennas.

The wireless device 180 may also include a signal detector 200 that may be used in an effort to detect and quantify the level of signals received by the transceiver 194. The signal detector 200 may detect such signals as total energy, energy per subcarrier per symbol, power spectral density and other signals. The wireless device 180 may also include a digital signal processor (DSP) 202 for use in processing signals. The DSP 202 may be configured to generate a data unit for transmission. The wireless device 180 may further comprise a display 204, and a user interface 206. The user interface 206 may include a touchscreen, keypad, a microphone, and/or a speaker. The user interface 206 may include any element or component that conveys information to a user of the wireless device 180 and/or receives input from the user.

The various components of the wireless device 180 may be coupled together by one or more bus systems 208. The bus systems 208 may include a data bus, for example, as well as a power bus, a control signal bus, and a status signal bus in addition to the data bus. The components of the wireless device 180 may be coupled together or accept or provide inputs to each other using some other mechanism.

Figure 9:
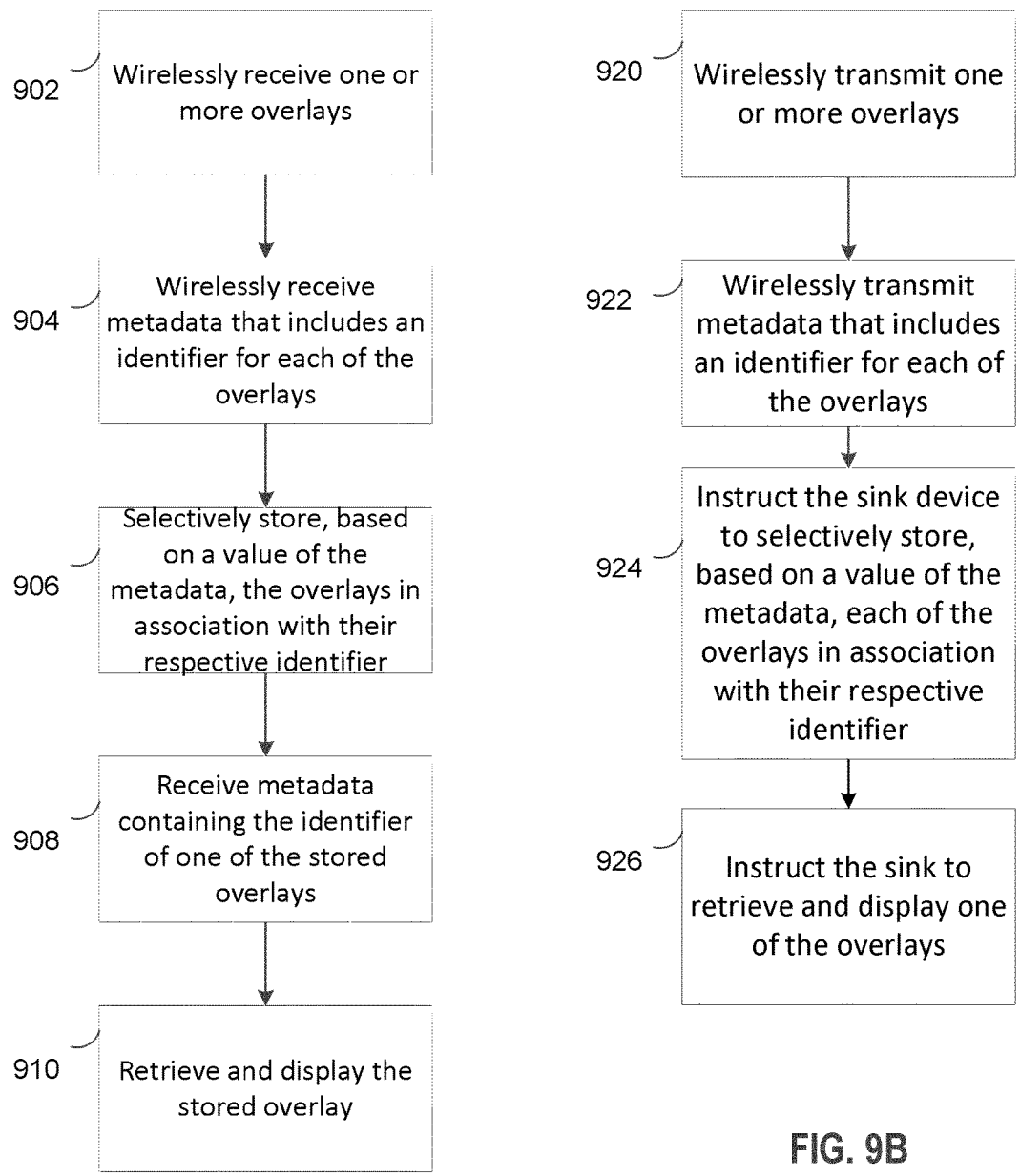
FIG. 9A is a flowchart of an overlay handling process in a sink.
FIG. 9B is a flowchart of an overlay handling process in a source.

Although a number of separate components are illustrated in FIG. 9, one or more of the components may be combined or commonly implemented. For example, the processor 184 may be used to implement not only the functionality described above with respect to the processor 184, but also to implement the functionality described above with respect to the signal detector 200 and/or the DSP 202. Further, each of the components illustrated in FIG. 9 may be implemented using a plurality of separate elements. Furthermore, the processor 184 may be used to implement any of the components, modules, circuits, or the like described below, or each may be implemented using a plurality of separate elements.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

It should be understood that any reference to an element herein using a designation such as "first," "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-10 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP (e.g., the DSP 202) and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. In a display data sink device configured to wirelessly receive and control display data including one or more overlays from a source device, the one or more overlays comprising graphical content to be synchronized and displayed via a video stream with one or more image frames displayed via the video stream from the display data sink device, a method of handling the one or more overlays comprising:
wirelessly receiving, at the display data sink device, a first communication including graphics data associated with each of the one or more overlays, wherein the first communication further includes a first set of metadata associated with the one or more overlays, the first set of metadata defining information about synchronizing the one or more overlays with identifiers for the one or more overlays, and the first set of metadata further defining information about displaying, based on the synchronizing, the one or more overlays, wherein the first set of metadata includes an identifier for each of the one or more overlays, and wherein the first set of metadata further includes a presentation_mode parameter value defining a presentation mode for displaying a first overlay at the display data sink device;
wirelessly receiving, at the display data sink device, a second communication including a second set of metadata, the second set of metadata including a parameter value that corresponds to the identifier for the first overlay of the one or more overlays;
synchronizing the first overlay with the parameter value that corresponds to the identifier for the first overlay; and
displaying the first overlay at the display data sink device according to the graphics data and the presentation_mode parameter value associated with the first overlay.

2. The method of claim 1, wherein the second set of metadata does not include graphics data associated with the first overlay.

3. The method of claim 1, wherein the second set of metadata comprises a presentation time stamp and a display location, and wherein the displaying is performed in accordance with the presentation time stamp and the display location.

4. The method of claim 1, wherein the second set of metadata further includes the presentation_mode parameter value defining the presentation mode for displaying the first overlay at the display data sink device, and wherein displaying the graphics data associated with the first overlay comprises retrieving the graphics data associated with the first overlay based in part on the presentation_mode parameter value.

5. The method of claim 1, wherein the method further comprises, in response to receiving the first communication, selectively storing, at the display data sink device, the graphics data associated with each of the one or more overlays according to the respective identifier for each of the one or more overlays and further based on the presentation_mode parameter value, wherein selectively storing comprises:
the display data sink device storing the graphics data associated with each of the one or more overlays if the presentation_mode parameter value indicates an instruction for the display data sink device to follow a passive presentation mode; and
the display data sink device not storing the graphics data associated with each of the one or more overlays if the presentation_mode parameter value does not indicate the instruction for the display data sink device to follow the passive presentation mode.

6. The method of claim 1, wherein the first set of metadata includes one or more of: a set of parameters for determining that the display data sink device can support overlays and alpha blending information defining an alpha blending mode to be used with one of the one or more overlays.

7. The method of claim 6, wherein the first set of metadata includes an indication that per-pixel alpha data for blending is included in a packetized elementary stream (PES) packet with an offset parameter indicating a location at a data field at which the per-pixel alpha data is included.

8. The method of claim 1, wherein the second set of metadata includes alpha blending information defining an alpha blending mode to be used with one of the one or more overlays.

9. The method of claim 1, further comprising sending information to the source device indicating that a user action has occurred prior to the receiving and displaying.

10. The method of claim 1, wherein the graphics data associated with each of the one or more overlays is received as a Moving Picture Experts Group 2 (MPEG2) transport stream, wherein the first communication comprises a PES header in the MPEG2 transport stream, wherein the PES header comprises a PES header format including fields that include information defining properties for at least the one or more overlays, and wherein one or more portions of the transport stream are separately decoded on one or more other transport streams.

11. In a display data source device configured to wirelessly transmit display data including one or more overlays to a display data sink device for being controlled at the display data sink device, the one or more overlays comprising graphical content to be synchronized and displayed via a video stream with one or more image frames displayed via the video stream at the display data sink device, a method of handling the one or more overlays comprising:
wirelessly transmitting, from the display data source device to the display data sink device, a first communication including graphics data associated with each of the one or more overlays, wherein the first communication further includes a first set of metadata associated with the one or more overlays, the first set of metadata defining information about synchronizing the one or more overlays with identifiers for the one or more overlays and the first set of metadata further defining information about displaying, based on the synchronizing, the one or more overlays according to the graphics data associated with the one or more overlays, wherein the first set of metadata includes an identifier for each of the one or more overlays, and wherein the first set of metadata further includes a presentation_mode parameter value defining a presentation mode for displaying a first overlay at the display data sink device; and
wirelessly transmitting, from the display data source device to the display data sink device, a second communication including a second set of metadata the second set of metadata including a parameter value that corresponds to the identifier for the first overlay of the one or more overlays for synchronizing the first overlay with the parameter value that corresponds to the identifier for the first overlay of the one or more overlays, the synchronizing being for displaying the first overlay at the display data sink device according to the graphics data and the presentation_mode parameter value associated with the first overlay.

12. The method of claim 11, further comprising:
receiving information from the display data sink device indicating that a user action has occurred on the display data sink device; and
in response to the receiving, transmitting, to the display data sink device, instruction information instructing the display data sink device to, in response to the receiving, synchronize the first overlay with the parameter value that corresponds to the identifier for the first overlay of the one or more overlays and, based on the synchronizing, retrieve and display the first overlay at the display data sink device.

13. A display data sink device comprising:
a memory; and
a processor configured to, in connection with the memory and a data receiving component of the display data sink device:
wirelessly receive and control display data including one or more overlays from a source device, wherein the one or more overlays comprise graphical content to be synchronized and displayed via a video stream with one or more image frames displayed via the video stream from the display data sink device;
wirelessly receive, at the display data sink device, a first communication including graphics data associated with each of the one or more overlays, wherein the first communication further includes a first set of metadata associated with the one or more overlays, the first set of metadata defining information about synchronizing the one or more overlays with identifiers for the one or more overlays, and the first set of metadata further defining information about displaying, based on the synchronizing, the one or more overlays, wherein the first set of metadata includes an identifier for each of the one or more overlays, and wherein the first set of metadata further includes a presentation_mode parameter value defining a presentation mode for displaying a first overlay at the display data sink device;
wirelessly receive, at the display data sink device, a second communication including a second set of metadata, the second set of metadata including a parameter value that corresponds to the identifier for the first overlay of the one or more overlays;
synchronize the first overlay with the parameter value that corresponds to the identifier for the first overlay; and
display the first overlay at the display data sink device according to the graphics data and the presentation_mode parameter value associated with the first overlay.

14. The device of claim 13, further comprising a decoder, wherein the processor is further configured to decode the graphics data associated with the first overlay using the decoder.

15. The device of claim 13, wherein the second set of metadata does not include graphics data associated with the first overlay.

16. The device of claim 13, wherein the second set of metadata comprises a presentation time stamp and a display location for the display data sink device, and wherein the processor is further configured to display the first overlay in accordance with the presentation time stamp and the display location for the display data sink device.

17. The device of claim 13, wherein the second set of metadata further includes the presentation_mode parameter value defining the presentation mode for displaying the first overlay at the display data sink device, and wherein the processor is further configured to retrieve the graphics data associated with the first overlay further based on of the presentation_mode parameter value.

18. The device of claim 13, wherein the processor is further configured to, in connection with the memory, and in response to wirelessly receiving the first communication, selectively store, at the display data sink device, the graphics data associated with each of the one or more overlays according to the respective identifier for each of the one or more overlays and further based on the presentation_mode parameter value, wherein selectively storing comprises:
storing the graphics data associated with each of the one or more overlays in the memory if the presentation_mode parameter value indicates an instruction for the display data sink device to follow a passive presentation mode; and
not storing the graphics data associated with each of the one or more overlays in the memory if the presentation_mode parameter value does not indicate the instruction for the display data sink device to follow the passive presentation mode.

19. The device of claim 13, wherein the first set of metadata includes one or more of: a set of parameters for determining that the display data sink device can support overlays and alpha blending information defining an alpha blending mode for the display data sink device to use with one of the one or more overlays.

20. The device of claim 19, wherein the first set of metadata includes an indication that per-pixel alpha data for blending is included in a packetized elementary stream (PES) packet with an offset parameter indicating a location at a data field at which the per-pixel alpha data is included.

21. The device of claim 13, wherein the second set of metadata includes alpha blending information defining an alpha blending mode for the display data sink device to use with one of the one or more overlays.

22. The device of claim 13, further comprising a data transmitting component, wherein the processor is further configured to transmit information to the source device via the data transmitting component, the information indicating that a user action has occurred prior to the wireless receiving and displaying.

23. The device of claim 13, wherein the processor is further configured to receive the one or more overlays as a Moving Picture Experts Group 2 (MPEG2) transport stream, wherein the first set of metadata is provided in a PES header in the MPEG2 transport stream, wherein the PES header comprises a PES header format including fields that include information defining properties for at least the one or more overlays, and wherein one or more portions of the transport stream are separately decoded on one or more other transport streams.

24. A display data source device configured to wirelessly transmit display data including one or more overlays to a display data sink device for being controlled at the display data sink device, wherein the one or more overlays comprise graphical content to be synchronized and displayed via a video stream with one or more image frames displayed via the video stream at the display data sink device, and to handle the one or more overlays, the display data source device comprising:
  a memory; and
  a processor configured to, in connection with the memory and a data transmitting component of the display data source device:
    wirelessly transmit, from the display data source device to the display data sink device, a first communication including graphics data associated with each of the one or more overlays, wherein the first communication further includes a first set of metadata associated with the one or more overlays, the first set of metadata defining information about synchronizing the one or more overlays with identifiers for the one or more overlays and the first set of metadata further defining information about displaying, based on the synchronizing, the one or more overlays according to the graphics data associated with the one or more overlays, wherein the first set of metadata includes an identifier for each of the one or more overlays, and wherein the first set of metadata further includes a presentation_mode parameter value defining a presentation mode for displaying a first overlay at the display data sink device; and
    wirelessly transmit, from the display data source device to the display data sink device, a second communication including a second set of metadata the second set of metadata including a parameter value that corresponds to the identifier for the first overlay of the one or more overlays for synchronizing the first overlay with the parameter value that corresponds to the identifier for the first overlay of the one or more overlays, the synchronizing being for displaying the first overlay at the display data sink device according to the graphics data and the presentation_mode parameter value associated with the first overlay.

25. The device of claim 24, wherein the source device further comprises a data receiving component, and wherein the processor is further configured to:
  receive information from the display data sink device via the data receiving component indicating that a user action has occurred on the display data sink device; and
  in response to the receiving, transmit, to the display data sink device, via the data transmitting component, information instructing the display data sink device to, in response to the receiving, synchronize the first overlay with the parameter value that corresponds to the identifier for the first overlay of the one or more overlays and, based on the synchronizing, retrieve and display the first overlay at the display data sink device.

* * * * *